United States Patent [19]
Buckley et al.

[11] Patent Number: 6,035,327
[45] Date of Patent: Mar. 7, 2000

[54] SMTP EXTENSION TO PRESERVE PER-MESSAGE AND PER-RECIPIENT PROPERTIES

[75] Inventors: David Buckley; Donald Gordon Brown, both of Bellevue; Wayne Merl Cranston, Renton, all of Wash.

[73] Assignee: Microsoft Corporation, Redmond, Wash.

[21] Appl. No.: 08/987,338

[22] Filed: Dec. 8, 1997

[51] Int. Cl.[7] ............................. G06F 13/38; G06F 15/17
[52] U.S. Cl. .......................... 709/206; 709/230; 709/249
[58] Field of Search .................................. 709/206, 227, 709/230, 236, 249, 203, 229; 370/466, 467, 469

[56] References Cited

U.S. PATENT DOCUMENTS

| | | | |
|---|---|---|---|
| 5,740,374 | 4/1998 | Raffali-Schreinemachers | 709/230 |
| 5,742,845 | 4/1998 | Wagner . | |
| 5,768,505 | 6/1998 | Gilchrist et al. | 709/203 |
| 5,790,809 | 8/1998 | Holmes | 709/206 |
| 5,878,220 | 3/1999 | Olkin et al. | 709/229 |

OTHER PUBLICATIONS

Klensin et al.; RFC 1425; "SMTP Service Extensions", Feb. 1993.
Klensin et al.; RFC 1651; "SMTP Service Extensions", Jul. 1994.
Borenstein, N. et al.; RFC 1521; "MIME (Multipurpose Internet Mail Extensions) Part One: Mechanisms for Specifying and Describing the Format of Internet Message Bodies," Bellcore, Sep. 1993.
Crocker, David H., et al.; RFC 822; "Standard for the Format of ARPA Internet Text Messages," University of Delaware, Aug. 13, 1982.
Klensin, J., et al.; RFC 1869; "SMTP Service Extensions," MCI, Nov. 1995.
Klensin, J., et al; RFC 1870; "SMTP Service Extension for Message Size Declaration," MCI, Nov. 1995.
Moore, K.; RFC 1891; "SMTP Service Extension for Delivery Status Notifications,"; University of Tennessee, Jan. 1996.
Postel, Johnathan B.; RFC 821; "Simple Mail Transfer Protocol,"; University of Southern California, Aug. 1982.

*Primary Examiner*—Mark H. Rinehart
*Assistant Examiner*—Marc D. Thompson
*Attorney, Agent, or Firm*—Workman, Nydegger, Seeley

[57] ABSTRACT

The SMTP protocol takes a message formatted according to a defined internet standard and wraps the message in an envelope. The message and envelope are sent to servers for transfer through the Internet to their intended destination. The SMTP protocol strictly defines the information that is transferred in the envelope and the format of the message. There is thus a real possibility that when messages are transferred from one network into an SMTP network that information will either be lost or not transferred correctly. The present invention provides systems and methods that take advantage of defined mechanisms to extend the SMTP protocol in order to create the novel extension that allows the transfer of virtually any information after the envelope is transferred but before the message is transferred. The invention allows information usually contained in the message portion to be transferred in the envelope portion. The invention also allows the preservation and transfer of information that would otherwise be lost.

34 Claims, 12 Drawing Sheets

SMTP EXTENSION TO PRESERVE PER-MESSAGE AND PER-RECIPIENT PROPERTIES

BACKGROUND OF THE INVENTION

1. The Field of the Invention

The present invention relates to systems and methods for extending the capability of email protocols used to transfer messages between mail servers. More specifically, the present invention relates to systems and methods that may be used to extend the SMTP or similar mail protocol to transfer additional data that is not defined in the mail protocols.

2. The Prior State of the Art

Although computers were once isolated and had minimal or little interaction with other computers, computers today interact with a wide variety of other computers through Local Area Networks (LANs), Wide Area Networks (WANs), dial-up connections, and so forth. With the widespread growth of the Internet, connectivity between computers is becoming more important and has opened up many new applications and technologies completely unthought of just a few short years ago. The growth of large-scale networks and the widespread availability of low-cost personal computers has fundamentally changed the way that many people work, interact, communicate, and play.

Electronic communications among users of various computer systems have been known for many years. Many companies have developed internal electronic mail systems that allow email communications between various computers connected to corporate LANs or other networks. Many companies have reengineered their processes and procedures to take maximum advantage of email communications in order to provide a convenient mechanism for exchanging information and documents, thus reducing the handling of paperwork and speeding the flow of information between and among employees of various departments. Traditionally, however, large-scale networks connecting various divisions over vast distances were extremely expensive. In addition, the large-scale networks which did exist generally used proprietary protocols were difficult to interconnect to other networks.

With the growth and development of the Internet, however, the situation has changed dramatically. Today, a company may install a corporate LAN at sites separated by large geographic distances and "backbone" communications between sites over the Internet. In many ways, the Internet has become a standard with which any viable network must interact.

TIraditionally, however, interaction with the Internet in order to backbone communications had many limitations. For example, until recently the Internet supported only plain text messaging. In contradistinction, many corporate LANs and other networks supported a wide array of rich text and other formatting features and allowed a wide variety of information to be exchanged among users. Thus, the Internet became a kind of "lowest common denominator" which provided basic functionality, but lacked support for many advanced features found in certain other networks. Although this situation is changing through the adoption of new standards for the Internet, the Internet still lags many advanced networking systems.

Standards for the Internet are documented in various "RFC" documents. The basic format of mail messages and transfer of mail messages is documented in RFC 821 and RFC 822, both of which are incorporated herein by reference. RFC 822 defines the various formats of an email message and RFC 821 defines the Simple Mail Transfer Protocol (SMTP) which is used to transfer 822 messages through the Internet. In essence, SMTP wraps the 822 message in an "envelope" and transfers the message between servers. The basic sequence of events which occur when a mail message is transferred using the SMTP protocol is 1) a connection is established between a sending server and a receiving server; 2) the sending server transfers the envelope information; 3) the sending server transfers the mail message; and 4) the sending server terminates the connection to the receiving server. The transfer of the envelope information is sometimes referred to as the 821 session and the transfer of the mail message is sometimes referred to as the 822 session. This is because the information defined in RFC 821 is transferred as the envelope and the information defined in RFC 822 is transferred as the mail message.

Because of the limited variety of information and formats that may be transferred as part of either the 821 or 822 session, information is occasionally lost when mail messages originate in one network and are backboned across the Internet to a second network. Information that does not directly translate into one of the defined parameters in either the 821 session or 822 session is often stripped when the mail message is forwarded through the Internet. In addition, even if information is not stripped, it may reside in the wrong session. For example, certain networks have or would like certain information to reside at a level analogous to the envelope while in the Internet such information is part of the 822 session. This requires a network desiring access to the information to decode each 822 message from the Internet and extract the desired information. If a message is forwarded between multiple servers using an SMTP protocol, in certain situations each server may have to decode the 822 message to retrieve the information. This is a time consuming and burdensome task. In addition to the above situations, many networks allow users to define information that is carried along as part of an email message in one or more custom data fields. Such custom information is lost when a message is transferred over the Internet due to the lack of support for custom information in the SMTP protocol and the 822 mail message.

Although various extensions have been defined for the SMTP protocol, there does not currently exist any extension which allows custom data or data extracted from the 822 mail message to be transferred as part of the 821 session. It would, therefore, be highly desirable to provide an extension to the SMTP or similar protocol which allowed any desired information to be transferred via the SMTP 821 session or similar protocol so that information loss can be minimized or eliminated. It would also be desirable to provide a mechanism to transfer desired information at a level which does not require the receiving server to decode the 822 message in order to have access to desired information.

SUMMARY AND OBJECTS OF THE INVENTION

The problems in the prior state of the art have been successfully overcome by the present invention which is directed to systems and methods for extending the SMTP protocol in order to allow transfer of information not presently part of the 821 or 822 sessions. The extension allows the transfer of virtually any type of information.

The present invention utilizes the methods for creating private extensions defined in RFC 1869, incorporated herein by reference. This RFC shows how private extensions may be discovered when sending information to another server. The present invention uses this mechanism to ensure that a desired receiving server supports the desired extension.

When a server has a message to send to another server, the sending server attempts to determine whether it is desirable to send additional information as part of the SMTP protocol. This decision can be made based on a wide variety of factors. For example, if the message contains no information that should be sent as part of the SMTP protocol, then no such information need be created or obtained. In addition, if the message contains no information that will be lost during a transfer over an SMTP network, then perhaps no additional information need be sent. Finally, the system may have an indication that messages directed to a certain destination or to a certain receiving server should or should not have specific additional information sent as part of the SMTP protocol.

Assuming that it is desirable to send information as part of the SMTP protocol, the sending server obtains the desired information that should be transferred as part of the SMTP protocol. Such information may include, for example, various information extracted from the 822 message or various other information that is not necessarily part of the 822 message but, rather, is obtained from some other source. The desired information is then encoded according to a standard that both the sending server and receiving server understand. Since information accompanying the message may be information associated with the entire message (per-message information) or may be information associated with an individual recipient (per-recipient information), it may be desirable to encode the information such that both per-message and per-recipient information is included, as appropriate.

The sending server then initiates contact with the receiving server. When a connection is established between the sending server and the receiving server, the sending server sends information to the receiving server designed to elicit all the SMTP extensions supported by the receiving server. The sending server then identifies whether the receiving server supports the extension of the present invention. If the extension of the present invention is not supported, then normal transfer in accordance with the regular 821 and 822 sessions will occur without the transfer of the desired additional information. If, however, the receiving server does support the extension of the present invention, then the sending server first sends the envelope information of the 821 session, followed by the additional data using the extension of the present invention, and finally the sending server transfers the regular 822 session information. After completion of the transfer of the 822 session information, the connection to the receiving server is terminated as usual.

In one embodiment of the present invention, messages may contain per-message and/or per-recipient information that should be transferred as part of the SMTP session using the extension of the present invention. In such an embodiment, the per-message and per-recipient information is preferably encoded in a single data stream that can then be decoded by the receiving server in order to recover the desired information. The information that should be transferred as part of the SMTP protocol using the present invention often comes in the form of information stored as part of the message. In some systems, messages lo are comprised of various "properties" such as a message body property, one or more "To" properties indicating who the message is addressed to, various "CC" properties, and so forth. The additional information transferred in the SMTP protocol may comprise one or more of these message properties. In such an embodiment, the properties are encoded as a single data stream for transfer using the extension of the present invention, as previously described. Such encoding can take place using any format that is mutually understood by both the sending server and the receiving server.

In one embodiment, the encoding of properties to be transferred results in a stream of data containing the number of properties, a property tag property that identifies both the property and the data type of the property, and the value of the property. For multi-valued properties, the encoded information also includes the number of items in the property and the value for each item. If the property is a variable length data type, then the property also includes the size or length of the property. All such information is encoded within a single data stream and transferred to the receiving server.

A receiving server that supports the extension of the present invention will provide all the extensions supported to the sending server so that the sending server will recognize that the receiving server supports the extension of the present invention. In addition, when the additional data is transferred using the extension, the receiving server will check the format of both the extension command received to transfer the additional data and the format of the additional data to ensure that no errors occur. The receiving server also performs other various checks and tests to ensure that the desired information will be received without error.

It is, therefore, an object of the present invention to provide systems and methods for extending the SMTP or similar protocol to allow transfer of information not presently defined as part of the 821 or 822 sessions. This allows, for example, information normally transferred as part of the 822 session to be transferred as part of the 821 session. It also allows transfer of information that would otherwise be lost when messages from a non-SMTP network are transferred between servers using an SMTP protocol.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer readable media. Executable instructions comprise, for example, instructions and data which cause a general purpose computer, special purpose computer, or special purpose processing device to perform a certain function or group of functions.

Figure 1:
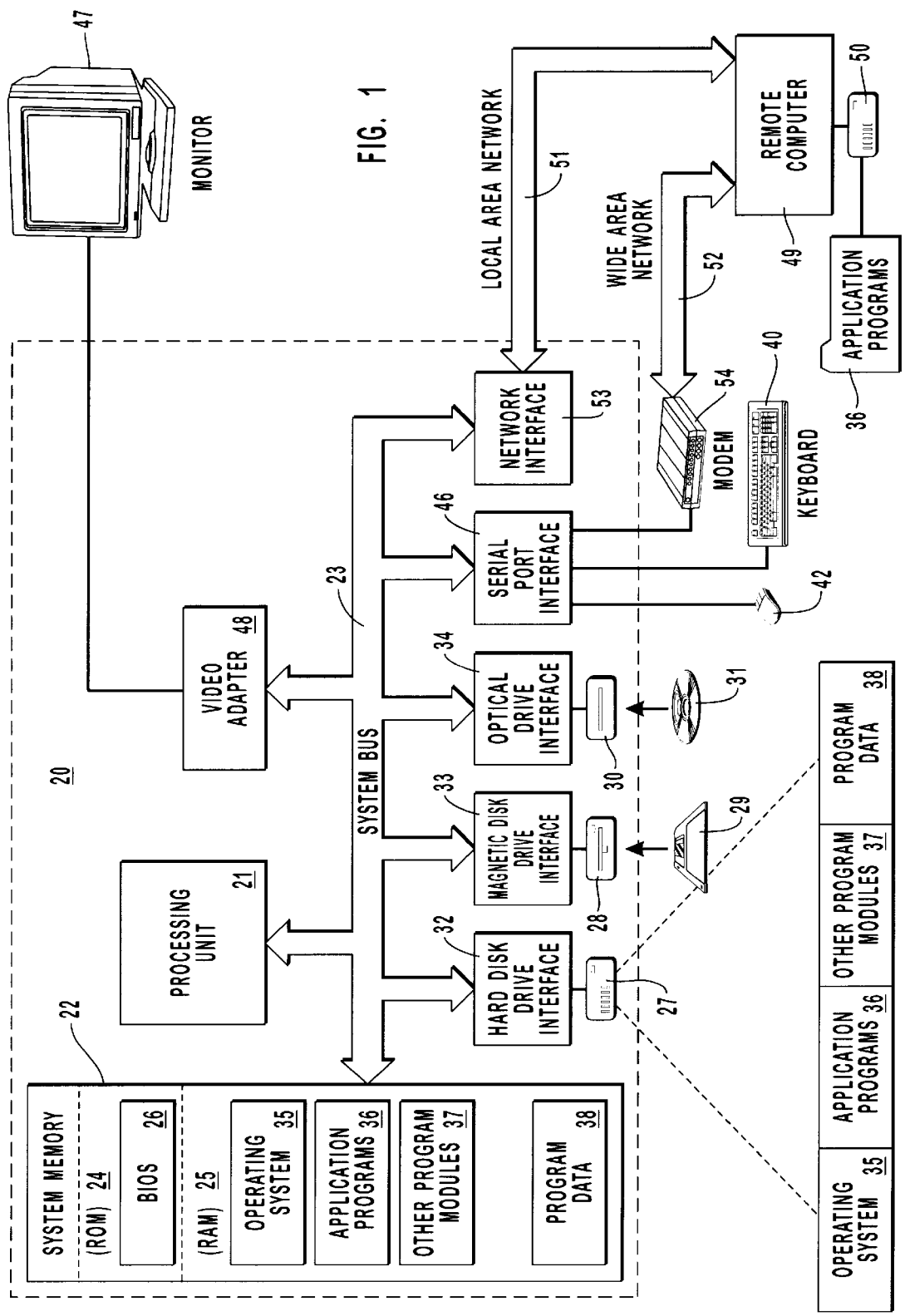
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
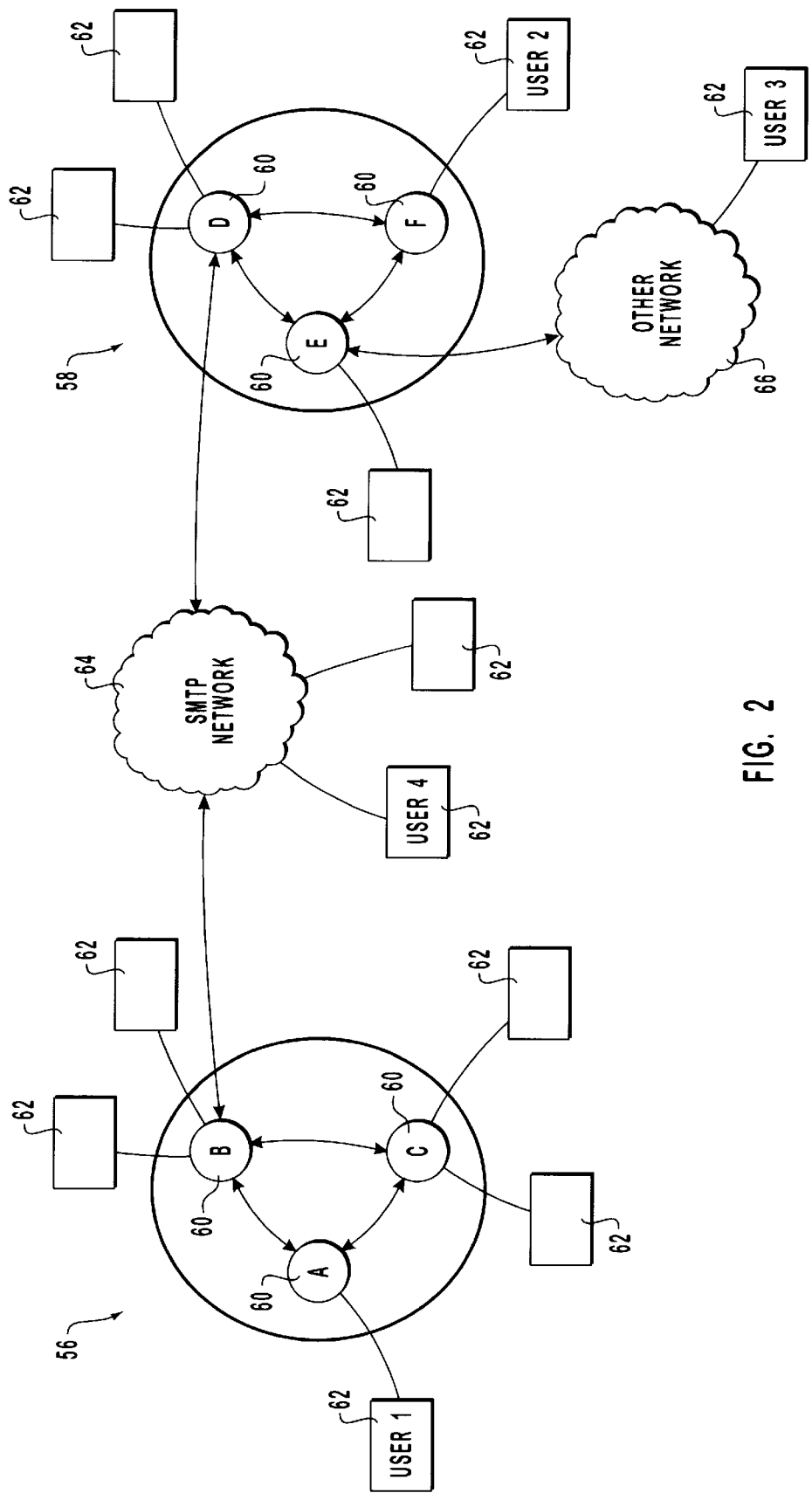
FIG. 2 illustrates multiple networks connected through an SMTP network.

FIG. 2 illustrates two networks that are interconnected using an SMTP network, such as the Internet. In FIG. 2, a first network is illustrated generally as 56 and a second network is illustrated generally as 58. Each network may comprise a plurality of servers or nodes that are responsible for transferring mail and other information among the local network. In FIG. 2 these nodes are illustrated by 60. Throughout this specification, the terms node and server will be used interchangeably. In FIG. 2 network 56 is illustrated as having three nodes, labeled A, B, and C. Network 58 is also illustrated as having three nodes labeled D, E, and F.

A server in network 56 and network 58 may have attached thereto one or more client systems 62. Client systems 62 may represent, for example, a work station or other client machine connected to a server which can create a message to be transferred to a designated location and receive a message that is sent from another location. Thus, for example, client system labeled user I may send a message to the client system labeled user 2.

As illustrated in FIG. 2, when messages flow between network 56 and network 58, they flow through SMTP network 64. SMTP network 64 may represent, for example, the Internet or any other SMTP network. The configuration illustrated in FIG. 2 where multiple LANs backbone email messages between them across the Internet is very common. In addition, networks, such as network 56 or 58 may be connected to yet other networks, as illustrated in FIG. 2 by other network 66. Each network in FIG. 2 may be running a different internal protocol. For this example, however, it is presumed that network 56 and network 58 are running the same protocol. Thus, it would be highly desirable when email messages were sent from a location in network 56 to a location in network 58 that all formatting and other information in that message was preserved while the message transmitted through SMTP network 64. As previously discussed, in many cases LANs, such as network 56 and 58 will support a much richer set of email options than is supported by an SMTP network. Thus, there is the possibility that information will be lost when a message is originated in one network and backboned or transferred though an SMTP network. Finally, the 821 and 822 sessions of the SMTP network may store information in a location where it is difficult for servers within network 56 and/or 58 to access.

As a final comment, note that when a message is received from an SMTP network, it may not be readily apparent at the time the message is received where the ultimate destination for the message will be. In other words, when a message is received at server D of network 58, server D may not be able to determine whether the message is to be delivered within network 58 or forwarded out of network 58 to network 66. As another alternative, an email message received at network 58 may be destined for multiple destinations both internal to and external to network 58. Although the issues of data loss and data stored at the wrong location is a concern in many instances, it is of particular concern in the scenario presented in FIG. 2 where two similar networks exchange messages using an intermediate SMTP network.

Figure 3:
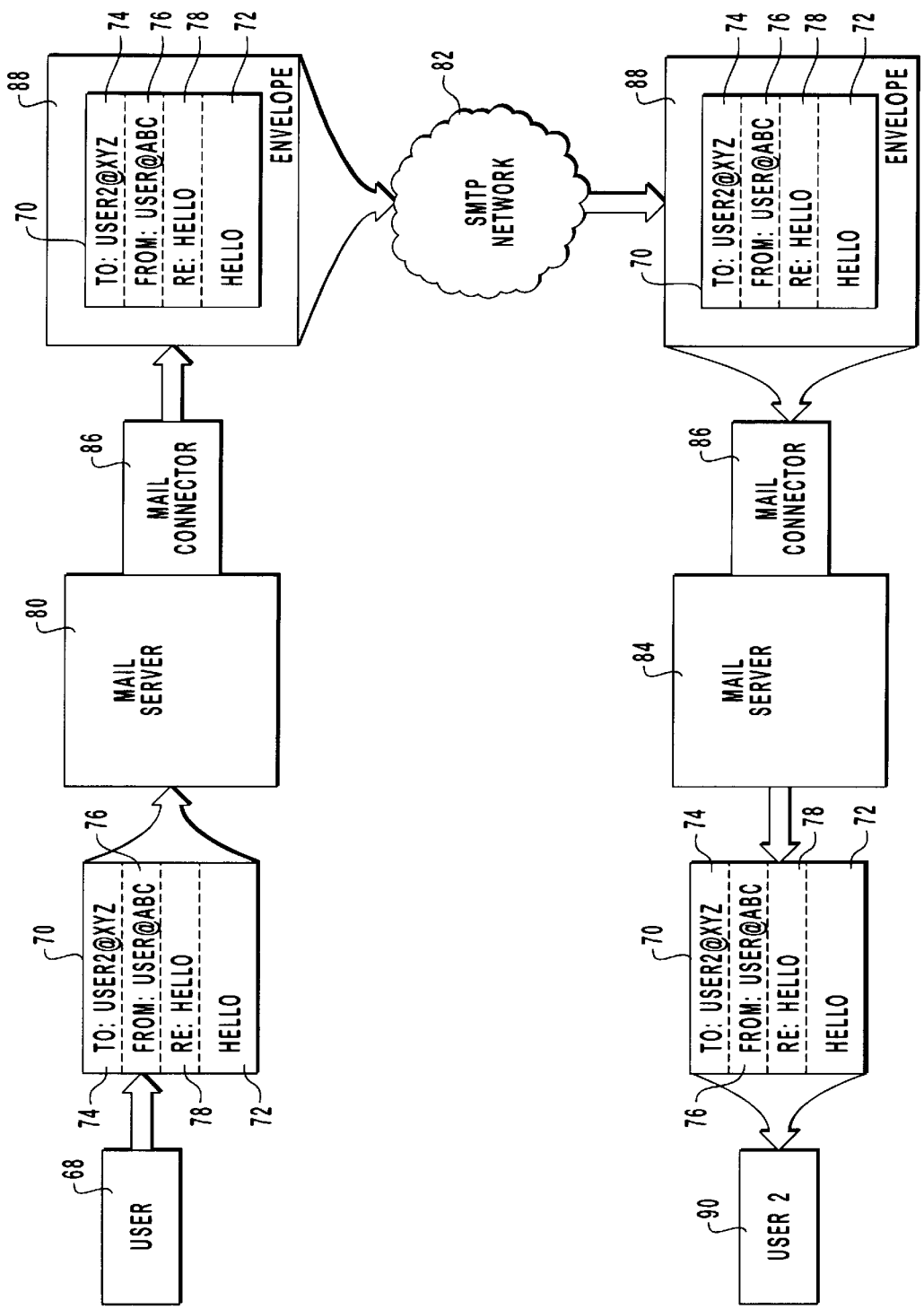
FIG. 3 illustrates the process of creating and sending messages through an SMTP network.

Referring now to FIG. 3, a high-level diagram of the process of exchanging information over an SMTP network is presented. In FIG. 3, a message is generated by a user, such as user 68. Such a message is illustrated in FIG. 3 by message 70. A message, such as message 70 may be comprised of various properties. For example, message 70 is illustrated as having message body property 72 and one or more header properties such as "To" property 74, "From" property 76, and "Subject" property 78.

After message 70 is created by user 68, it is forwarded to a server for further transfer toward its ultimate destination. In FIG. 3, user 68 transfers message 70 to mail server 80. Mail server 80 transfers message 70 through SMTP network 82 to mail server 84. Depending on the exact implementation and network configuration where mail server 80 and mail server 84 reside, mail server 80 and mail server 84 may use a mail connector, such as mail connector 86, to provide an interface to SMTP network 82. Other servers may not require a mail connector.

When message 70 is communicated from mail server 80 to mail server 84 through SMTP network 82, message 70 is in effect, encapsulated within an 821 session envelope, conceptually represented in FIG. 3 by envelope 88. When message 70 is received by mail service 84, mail service 84 may strip envelope 88 and extract message 70, placing it in a form to be transferred in a local network if required. Mail server 84 may then forward message 70 to its ultimate destination, illustrated in FIG. 3 as user 90.

Figure 4:
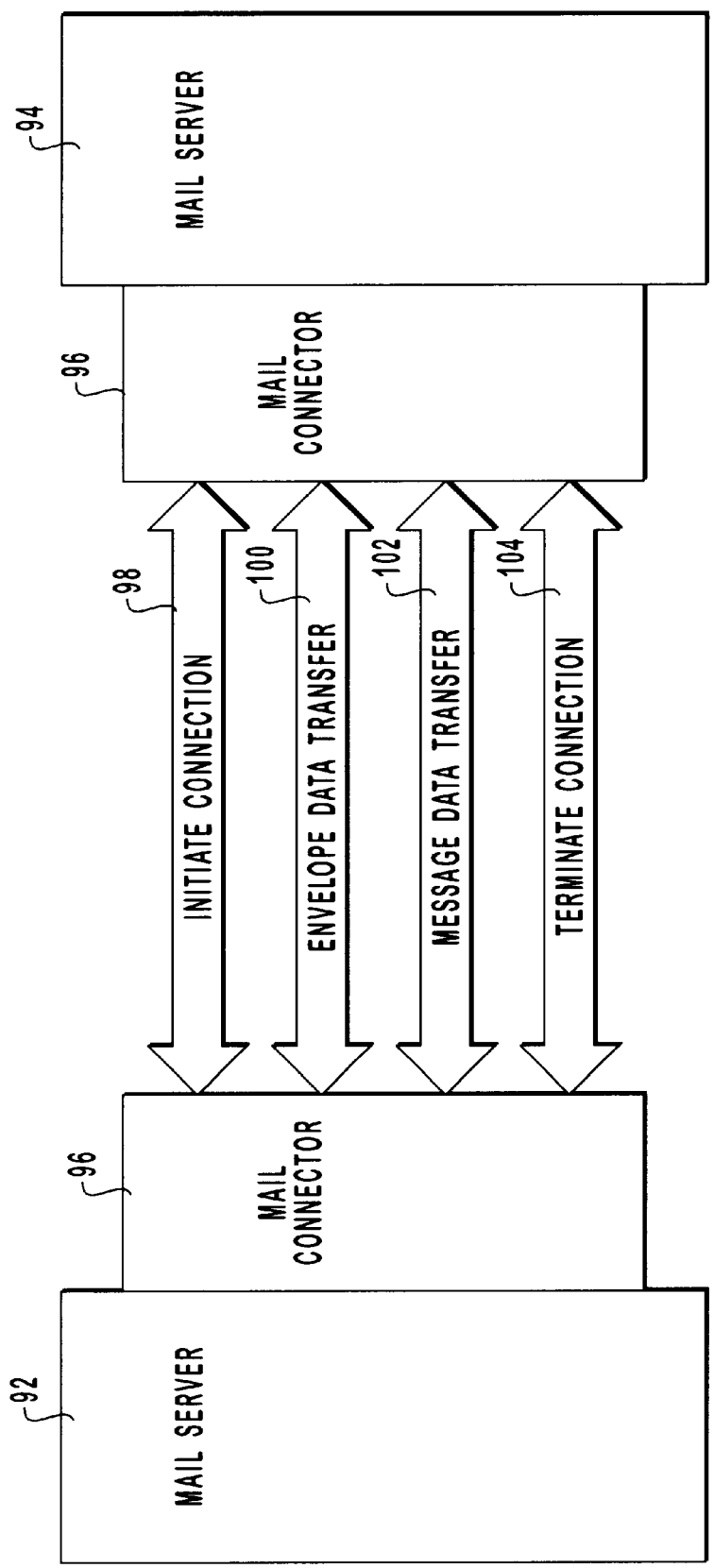
FIG. 4 illustrates the transfer of messages between servers according to the SMTP protocol.

Turning now to FIG. 4, the conceptual steps which occur when a message is transferred according to existing 821 and 822 sessions is presented. In FIG. 4, two mail servers, sending mail server 92 and receiving mail server 94, are illustrated. Also illustrated is mail connectors 96 which may or may not be necessary depending upon the exact configuration of mail servers 92 and 94.

When sending server 92 has information to transfer to mail server 94, mail server 92 initiates a connection to mail server 94. This is illustrated in FIG. 4 by initiate connection step 98. After the connection has been established, sending server 92 transfers the 821 envelope information to receiving server 94 as illustrated by envelope data transfer step 100. All the information that may be transferred at this point is defined in RFC 821. However, in general such information may include a from address and one or more to addresses. Note that the from and to addresses utilized in the 821 session may be different from the to and from addresses that are stored within the 822 message.

After the 821 envelope information has been transferred, the 822 message information is transferred next. This is illustrated in FIG. 4 by message data transfer step 102. Finally, after all 822 message data has been transferred, the connection is terminated as illustrated in terminate connection step 104. Note that the transfer of the 821 envelope information during envelope data transfer step 100 is often referred to as the 821 session and the transfer of the 822 message data illustrated by message data transfer step 102 is often referred to as the 822 session.

The following is an example of an SMTP transfer between sending mail server 92 and receiving mail server 94. In this example, information sent by sending mail server 92 to receiving mail server 94 is prefaced with an S: and information sent from receiving mail server 94 to sending mail server 92 is prefaced with an R:. In the following example it is presumed that sending mail server 92 has a host name of ABC.ORG and receiving mail server 94 has a host name of XYZ.ORG. In this example, user 1 of ABC.ORG is sending a mail message to user 2, user 3, and user 4.

```
OPEN CONNECTION

R:   <Wait for connection on TCP Port 25>
S:   <Open connection to server>
R:   220 XYZ.ORG Simple mail transfer service ready
S:   HELO ABC.ORG
R:   250 XYZ.ORG
SEND ENVELOPE S:   MAIL FROM:<User1@ABC.ORG>
R:   250 OK
S:   RCPT TO:<User2@XYZ.ORG>
R:   250 OK
S:   RCPT TO:<User3@XYZ.ORG
R:   550 No such user here
S:   RCPT TO:<User4@XYZ.ORG>
R:   250 OK
SEND MESSAGE S:   DATA
R:   354 Send message; end with <CRLF>.<CRLF>
S:   Blah blah blah . . .
S:   . . . etc. etc. etc.
S:   <CRLF>.<CRLF>
R:   250 OK
CLOSE CONNECTION S:   QUIT
R:   221 XYZ.ORG Service closing transmission channel
```

Figure 5A:
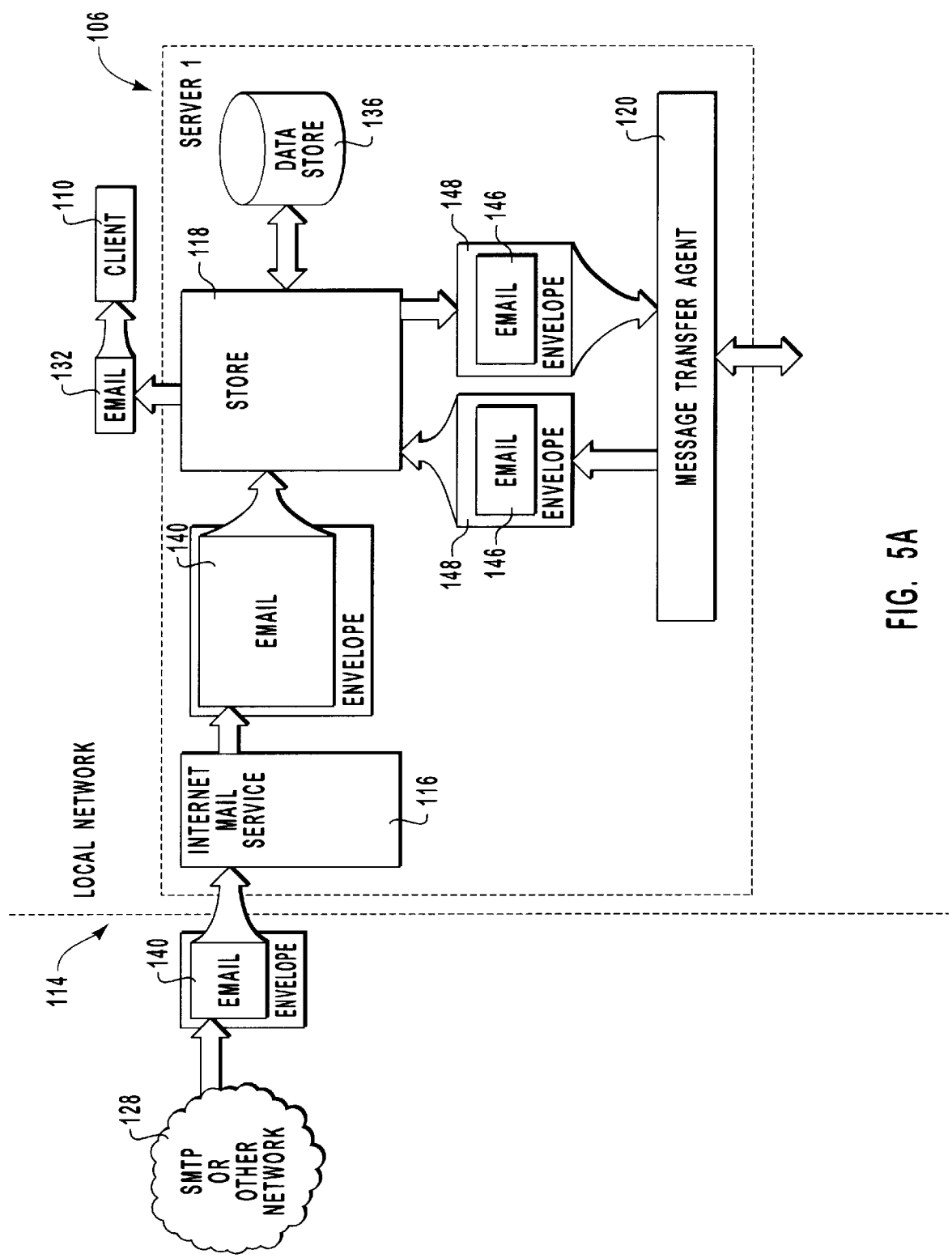
FIGS. 5A and 5B illustrate one network that may benefit from the present invention.
Figure 5B:
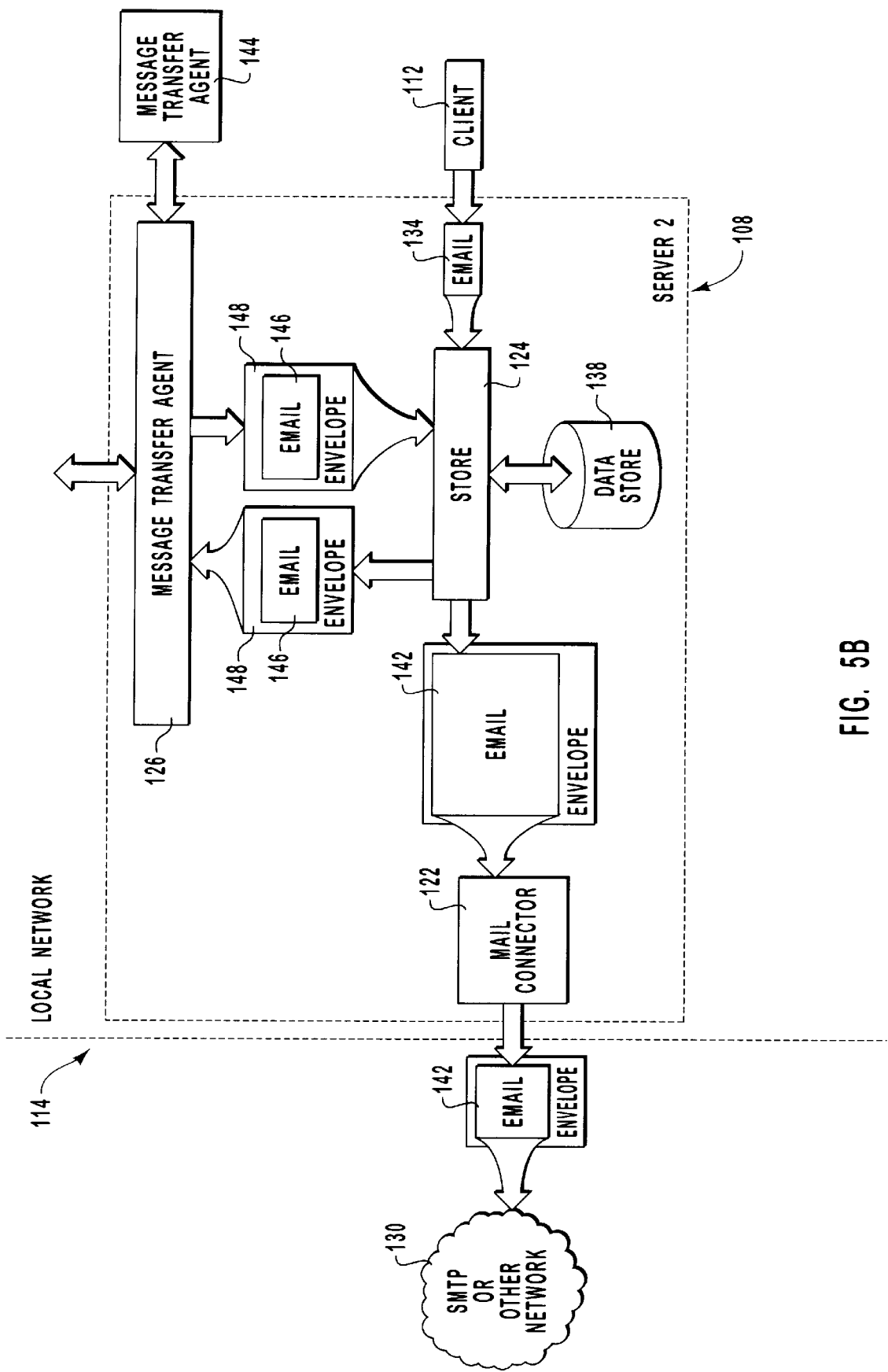

In order to provide an example of one possible embodiment where the present invention may be utilized, FIGS. 5A and 5B present a top-level diagram of a local network comprising two servers illustrated as server 106 (FIG. 5A) and server 108 (FIG. 5B). Each server may have one or more clients attached thereto, such as client system 110 and client system 112. Note that a server in the embodiment illustrated in FIGS. 5A and 5B is not required to have a client connected thereto. It happens that in many instances, however, servers will often have clients connected thereto.

In order to handle mail messages received within a network, such as local network 114, each server has networking and email software running thereon. In the embodiment illustrated in FIGS. 5A and 5B, the mail software on each server contains three primary components. These are illustrated in FIG. 5A by Internet mail service 116, store 118, and message transfer agent 120. Corresponding components are illustrated for server 108 in FIG. 5B as mail connector 122, store 124, and message transfer agent 126. Such an arrangement is representative, for example, of the arrangement used in a Microsoft Exchange server which is part of a Microsoft Exchange server network.

Internet mail service 116 and mail connector 122 are generally adapted to handle the various tasks that need to be performed when messages are received from an outside network or sent to an outside network. In FIGS. 5A and 5B these outside networks are illustrated by network 128 and network 130. In this sense, Internet mail service 116 and mail connector 122 perform analogous functions and the name of the mail connector ultimately used is typically dependent upon the type of network to which is connects. Thus, a mail connector that connects an exchange server to the Internet or other SMTP network is typically referred to as an Internet mail service or Internet mail connector. While mail connectors that connect an Exchange server to other types of networks are given other names. Thus, the names represented in FIGS. 5A and 5B are exemplary only.

In the embodiment illustrated in FIGS. 5A and 5B, store 118 and store 124 are responsible for, among other things, delivering a mail message to a recipient or receiving a mail message from a sender. Thus, store 118 and store 124 may contain various routing and delivery program modules necessary to ensure that a mail message is either delivered to a recipient, or forwarded to other components for delivery to a recipient. In FIG. 5A, for example, store 118 is illustrated as delivering email message 132 to client system 110. In FIG. 5B, store 124 is illustrated as receiving email message 134 from client system 112 for further delivery.

In many instances, mail messages and other information that are routed through local network 114 may be thought of as a collection of properties. This concept has previously been discussed somewhat with respect to FIG. 3. If each mail message is conceptually thought of as a collection of various properties, then the properties may be stored and manipulated. For example, store 118 and store 124 may comprise means for storing information so that it can be retrieved later. In one embodiment, store 118 and store 124 comprise a database engine that will take properties and store them in a location, such as data store 136 or data store 138. Such an approach may be highly useful, for example, for storing either temporarily or on a more permanent basis various mail and other information. As an example, mail systems generally assign a "mailbox" to a particular user or client system. Mail is delivered to this mailbox and remains there until user or client system opens the mail to look at it. At this time, the information in the mail message is transferred or copied from the mailbox to a location where it may be displayed and manipulated by a user. Thus the ability to temporarily or more permanently store various properties of mail messages is extremely valuable.

Data store 136 or 138 may be databases, in the traditional sense of the word, or may be simply locations either in memory or on a mass storage device where information is stored until it needs to be retrieved. In one embodiment of the present invention, one or more program modules in stores 118 and 124 act as a data store manager which provides an interface to data store 136 or 138. A component wishing to store information in data store 136 or 138 would submit the information to the appropriate program module and the program module would save the information to data store 136 or 138. Information may be retrieved in a similar manner. In one embodiment, such a data store program module is adapted to store any type of information submitted to it. Thus, it is possible to create new property information and store such information in data store 136 or 138 through such a program module.

As part of its responsibilities, store 118 and store 124 are responsible for routing information received from outside a network or transiting from local network 114. Thus, store 118 is shown as receiving mail 140 from Internet mail service 116. Store 118 will then deliver, store, or forward mail message 140 as appropriate. Similarly, FIG. 5B illustrates store 124 forwarding email message 142 to mail connector 122 for delivery to network 130.

If a recipient is known or connected to a server, then the store will deliver the information to the recipient. However, in networks that have more than one server, such as local network 114, messages may have to be forwarded to other servers for ultimate delivery. In FIGS. 5A and 5B, this is illustrated by the transfer of messages between server 106 and 108 through message transfer agent 120 and message transfer agent 126. In addition, messages may be transferred to additional servers through other transfer agents such as message transfer agent 144 illustrated in FIG. 5B.

If message transfer agents 120 and 126 have been developed to transfer specific properties as part of a message, it may be desirable to add an extension to the protocol used to transfer information between message transfer agents in order to transfer an additional "blob" of data that is not interpreted by the message transfer agents but simply passed on and carried along with the message. Such an approach may be particularly useful for established protocols which encapsulate a message and its accompanying properties within an envelope similar to the SMTP protocol previously discussed and illustrated, for example, by messages 140 and 142 of FIGS. 5A and 5B. The embodiment illustrated in FIGS. 5A and 5B shows mail messages being transferred within envelopes. For example, transferring of messages between message transfer agents may use an envelope structure as illustrated. This may be representative, for example, of X.400-type protocols. The X.400 protocol has an envelope, usually designated P1, and an actual message, usually designated P2. P1 and P2 are roughly analogous to the 821 and 822 sessions of the SMTP protocol. In FIGS. 5A and 5B, the email messages transferred between message transfer agents are illustrated as 146, and the envelopes are illustrated as 148. As illustrated in FIGS. 5A and 5B, store 118 and store 124 may be responsible for performing any desired formatting of the message before passing the message to the message transfer agent for delivery and transfer within the network.

Figure 6:
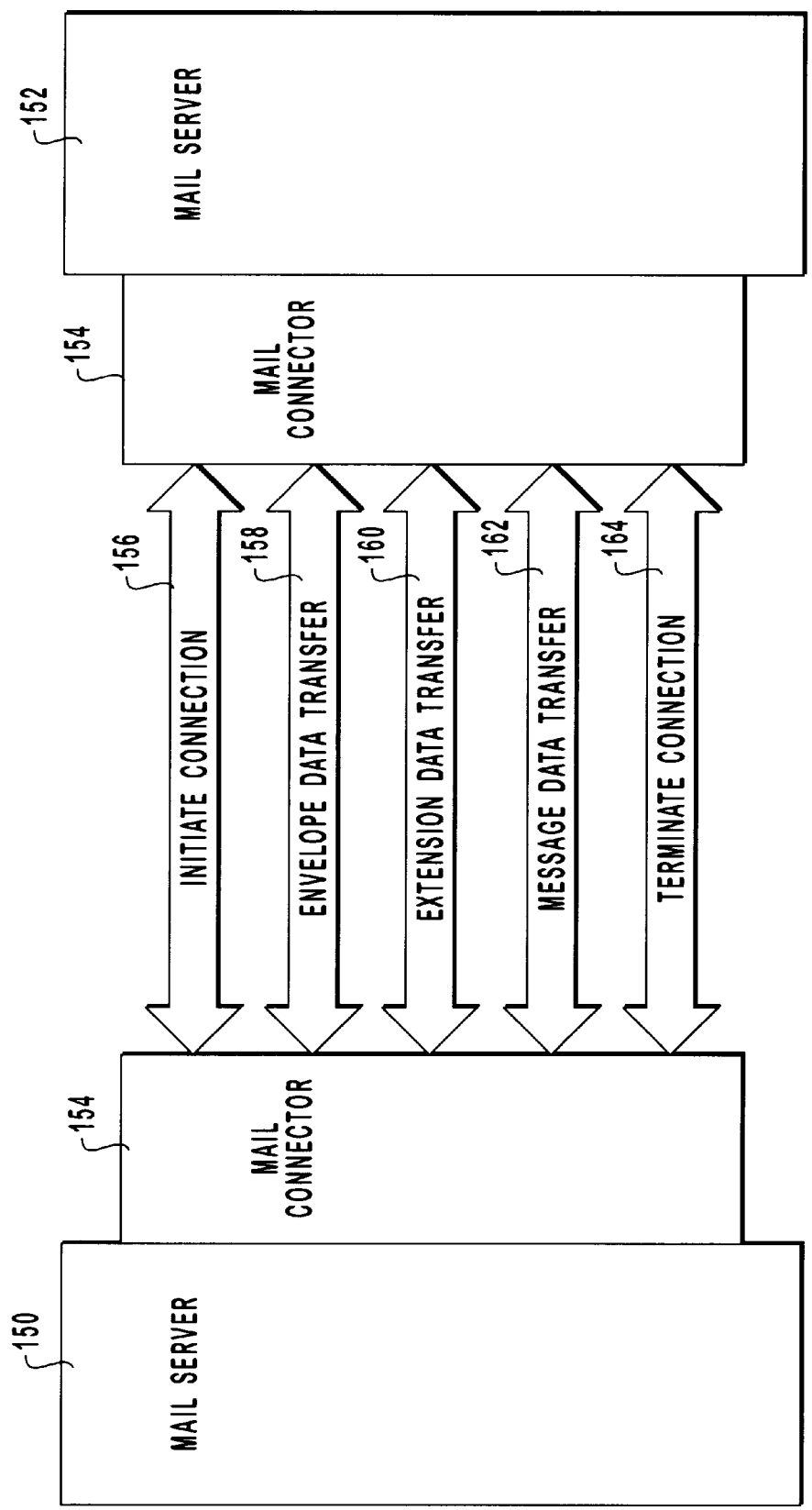
FIG. 6 illustrates transfer of messages and additional information using the SMTP protocol augmented by extensions of the present invention.

Turning now to FIG. 6, a top-level conceptual diagram of the operation of one embodiment of the present invention to transfer the envelope information in the 821 session, the message in the 822 session, and any additional data in an extension session is presented. FIG. 6 is basically a modified version of FIG. 4 showing where and how the extension of the present invention is used. In FIG. 6, sending mail server 150 desires to transfer a mail message comprising an envelope, a message, and additional data to receiving mail server 152. As in prior figures, mail server 150 and mail server 152 may comprise an optional mail connector, such as mail connector 154.

In one embodiment of the present invention, the procedure to transfer the mail message begins with a step which initiates a connection between sending mail server 150 and receiving mail server 152. In FIG. 6, this step is illustrated, for example, by initiate connection step 156. Initiate connection step 156 is but one example of a means for establishing a connection between the sending server and the receiving server. In general, however, every protocol that is used will have a step to initiate a connection between a sending server and a receiving server. All such steps for protocols of interest may be brought within the scope of means for establishing a connection between a sending server and a receiving server. When the protocol of interest is SMTP, then initiate connection step 156 may proceed as outlined and discussed in greater detail below.

After the connection has been established, the envelope is transferred next. This is illustrated in FIG. 6 by envelope data transfer step 158. Such a step is an example of means for transferring the envelope of a mail message from a first server to another server using a protocol of interest. Any mechanism suitable for transferring the information in the envelope from the sending server to the receiving server is appropriate for such a means. If the protocol of interest is SMTP, then such a means may, for example, be similar to the mechanism previously illustrated in conjunction with FIG. 4 to transfer the envelope information. In other words, such a means may comprise various command instructions in the SMTP protocol that results in the transfer of envelope information from mail server 150 to mail server 152.

As discussed in greater detail below, it is presently preferred that initiate connection step 156 be performed differently from that illustrated in FIG. 4 and the accompanying example, even though the SMTP protocol is used. This is because RFC 1869 defines an extended hello command (EHLO) which causes the receiving node to return a list of the extensions supported by the receiving node. This information allows the sending node to determine whether the receiving node actually supports the extension of the present invention. If, however, other mechanisms exist for the sending server to ascertain whether the receiving server supports the extension of the present invention, then the original steps illustrated in FIG. 4 and the accompanying example for initiating a contact may be sufficient.

If receiving server 150 supports the extension of the present invention, then sending server 150 next sends the additional information using the extension of the present invention. As illustrated in the example presented below, the sending server transfers additional information to the receiving server using a designated command with the same name as the extension name. In the example presented below, the extension name is "XEXCH50." Any other name that complies with the appropriate RFC standards may also be used to signal the appropriate extension. Although a detailed syntax of one embodiment of the extension of the present invention is presented below, in general, the syntax will contain the name of the extension and various parameters that help receiving server 152 to decode and/or determine whether there is an error in the command structure or data. As indicated in the example below, after the command is received by the receiving server, the sending server then transfers a stream of data containing the additional information that should be transferred.

The process of transferring the extension data from the sending server to the receiving server is illustrated in FIG. 6 by extension data transfer step 160. This step is an example of means for transferring additional data from the sending server to the receiving server using an extension to a protocol of interest. Depending on the protocol of interest, the exact sequence of commands to activate an extension and transfer an appropriate amount of data may be slightly different.

After the extension data has been transferred from the sending server to the receiving server, the next step is to transfer the message data. In an SMTP protocol, this would be the procedure which transfers the 822 message from the sending server to the receiving server. If the SMTP protocol is used, the standard procedure for the SMTP protocol to transfer an 822 message may be used for this step. This is illustrated in the example below. Message data transfer step 162 of FIG. 6 is an example of means for transferring a message from a sending server to a receiving server. After the message has been transferred from sending server 150 to receiving server 152, the next step is to terminate the connection as illustrated in FIG. 6 by terminate connection step 164. In the case of the SMTP protocol, this may occur, for example, as illustrated in the example below. Basically, any sequence of commands that cause the connection to be terminated in an appropriate fashion may be utilized. These are all examples of means for terminating a connection.

In order to illustrate a representative sequence of commands that are appropriate for performing the procedure illustrated and discussed in conjunction with FIG. 6, reference is now made to the following example:

```
OPEN CONNECTION

R:   <Wait for connection on TCP Port 25>
S:   <Open connection to server>
R:   220 XYZ.ORG Simple mail transfer service ready
S:   EHLO ABC.ORG
R:   250 -XYZ.ORG
R:   250 -EXPN
R:   250 -HELP
R:   250 XEXCH50
SEND ENVELOPE S:   MAIL FROM:<User1@ABC.ORG>
R:   250 OK
S:   RCPT TO:<User2@XYZ.ORG>
R:   250 OK
S:   RCPT TO:<User3@XYZ.ORG
R:   550 No such user here
S:   RCPT TO:<User4@XYZ.ORG>
R:   250 OK
SEND EXTENSION DATA S:   XEXCH50 124 2
R:   250 OK
S:   <124 bytes of binary data>
R:   250 OK
SEND MESSAGE S:   DATA
R:   354 Send message; end with <CRLF>.<CRLF>
S:   Blah blah blah . . .
S:   . . . etc. etc. etc.
S:   <CRLF>.<CRLF>
R:   250 OK
CLOSE CONNECTION S:   QUIT
R:   221 XYZ.ORG Service closing transmission channel
```

Note that although the example presented above in FIG. 6 shows the extension data being transferred between the envelope data and the message data, other orderings may also be possible and may be equivalent thereto.

Figure 7:
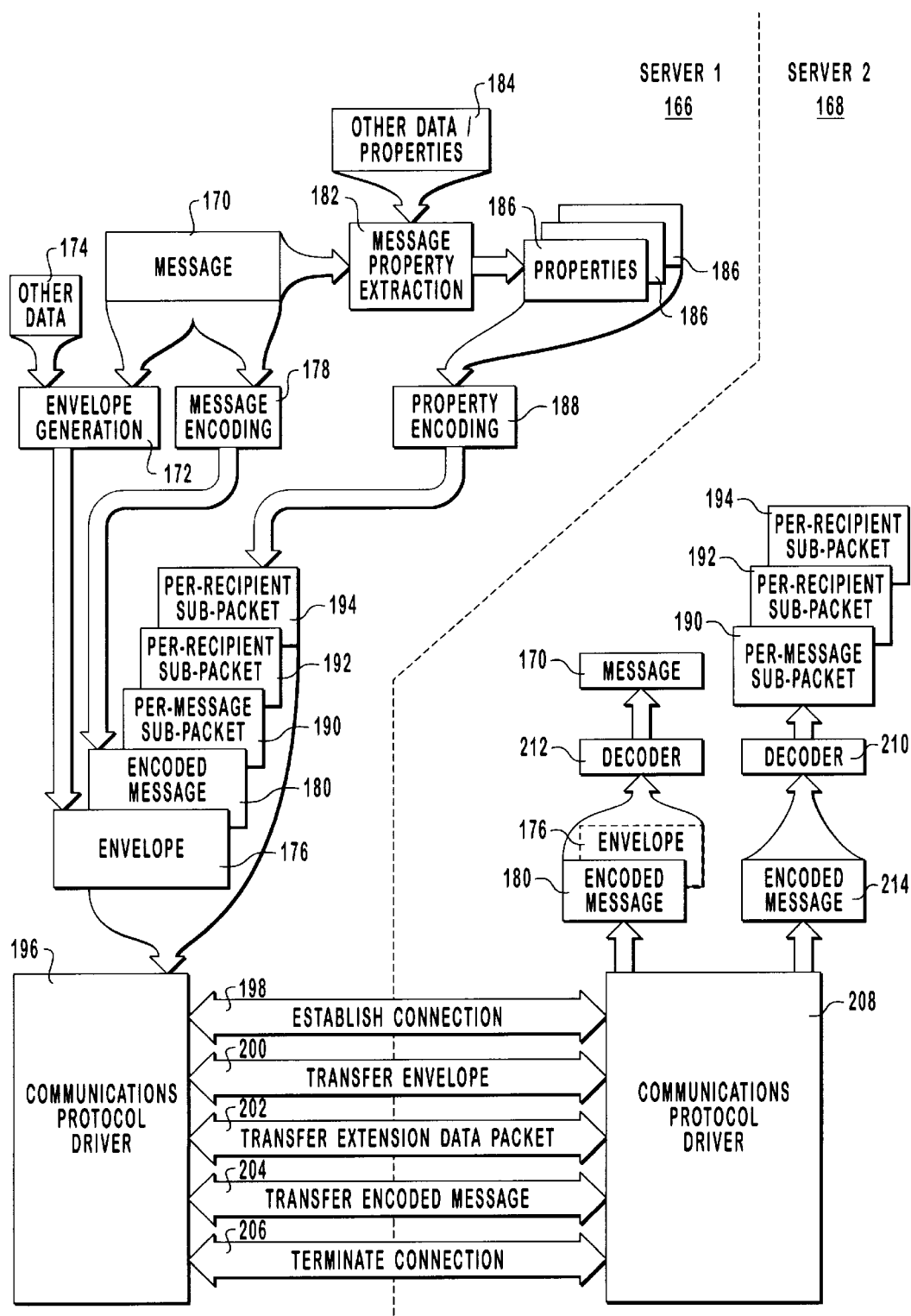
FIG. 7 illustrates a top-level diagram showing transfer of messages and other information according to one embodiment of the present invention.

Referring next to FIG. 7, the general structure of one embodiment that is adapted to transfer a mail message comprising an envelope and a message via one protocol and additional extension data via an extension to that protocol is presented. The embodiment illustrated in FIG. 7 has two servers, sending server 166 and receiving server 168. In FIG. 7, message 170 is a message either created by a user and sent to server 166 or a message received by server 166 from some other source. Message 170 is presumed to have been generated according to the format used within the network where server 166 resides. In this example, it is desired to send message 170 to server 168 via a protocol that is different from the internal network protocol used by the network where server 166 resides.

It is presumed that the protocol used to transfer information between server 166 and server 168 transfers mail messages uses an envelope and message structure similar to the SMTP, as previously described. Embodiments within the scope of this invention may, therefore, comprise means for generating an envelope to be sent with a mail message. By way of example, and not limitation, in FIG. 7 such means is illustrated by envelope generation component 172. In FIG. 7, envelope generation component 172 is responsible for producing the information that will be transferred in the envelope session, such as the 821 session of the SMTP protocol. In general, an envelope may contain information such as a field or parameter indicating who the message is from, and one or more fields or parameters indicating the destinations of the message. These parameters may not be the same as the from and to fields within the message. However, their purpose is similar. Often, such envelopes may be created through an examination of the information in message 170 or information from another location such as other data 174. If multiple destinations are required or if the message must be bifurcated and transferred into different formats, envelope generation component 172 may produce multiple envelopes, one for each different message or message type as required. In FIG. 7 the resulting envelope is illustrated by envelope 176.

If message 170 resides in a format different from the format that is required for transfer, message 170 may be reformatted or encoded into a format suitable for transfer to the receiving server. Therefore, embodiments within the scope of this invention may comprise means for encoding a message which exists in a format suitable for internal storage and transfer in one network into a format suitable for transfer to another network. By way of example, and not limitation, in the embodiment illustrated in FIG. 7, such means for encoding is illustrated by messaging coding component 178. Messaging coding component 178 is responsible for taking message 170 and placing it into a format that is suitable for transfer to server 168. In the embodiment illustrated in FIG. 7, the encoded message is illustrated as 180. It should be noted that not all implementations may require translation or encoding of a message in order to make it suitable for transfer. The details of whether any changes need to be made will be dependent upon the internal storage and transfer format of the message and the required format to be transferred using the designated protocol between the two networks. If no translation or encoding is required, then message encoding block 178 becomes a passthrough and encoded message 180 is identical to message 170. In other words, various means for encoding may not, in actuality, perform any encoding if none is required in order to render the message suitable for transfer using the desired protocol. In some instances, it may be convenient to refer to the combination of encoded message 180 and envelope 176 as a transfer-ready mail message, or, more simply, a mail message.

Since the present invention is directed toward transferring additional data along with the transfer-ready mail message, embodiments within the scope of this invention may comprise means for obtaining additional data that may be transferred along with a transfer-ready mail message. By way of example, and not limitation, in FIG. 7 such means for obtaining is represented by message property extraction component 182. Message property extraction component 182 is tasked with the responsibility of identifying and selecting appropriate information to be transferred along with the transfer-ready mail message. In general, additional data transferred along with transfer-ready mail messages fall into two broad categories. The first is a per-message category which contains information that is applied to the entire message no matter which recipient it goes to. The second category is per-recipient data. Per-recipient data refers to that data which is applicable to a particular recipient. Note that the per-recipient information may be evaluated and applied on a recipient-by-recipient basis. Not every message will have both per-recipient and per-message data. However, the present invention makes provisions for either or both in the additional data transferred with a transfer-ready message. In general, the per-recipient and per-message information that is to be transferred along with the transfer-ready message is drawn from the collection of properties that make up or are associated with a particular message, such as message 170 of FIG. 7. In the alternative, the present invention is broad enough to transfer any type of data that is desired. Thus, not only can information that is to be transferred with a transfer-ready message come from message properties, such as message 170, it may also come from other sources as indicated by other data/properties block 184. Block 184 simply represents any relevant source of information from which data to be transferred is drawn. In FIG. 7 the selected information that will be transferred with the transfer-ready message is illustrated by properties 186.

Extracting informatio n from message 170 for transfer as part of an ex tension data packet has several benefits. For example, in some networks, a server receiving message from an outside network, like an SMTP network, need s information that is encoded in the 822 message. In order to obtain this information, the 822 message must be decoded. If the message is thereafter forwarded across another SMTP Link to another server, that server will also have to decode the 822 message for the same information. It is much better, and much more efficient, to obtain the information once and encode it to be transferred as part of the extension data packet. This makes the desired data readily available to the receiving server. Thus, the ability to extract specific information from message 170 and transfer it in readily decodable form can provide significant performance gains.

As illustrated in FIG. 6 and discussed in the example presented above, a sending server generally finds out whether a receiving server can support the desired extension once a connection is made to the receiving server. In some cases it will be desirable to preassemble the information that might be sent and have it available for transfer should it be needed. Thus, one approach is to always prepare all possible data that might be transferred along with the transfer-ready mail message. Such a situation, however, is generally undesirable from a performance standpoint. Thus, embodiments within the scope of this invention may comprise means for examining a message in order to de termine whether transfer of additional data is likely to be supported or desired by the receiving server. In other words, in some instances it may be possible to determine that data either should be prepared or should not be prepared based on the examination of available information and the application of some general guidelines. For example, it would be possible to have a switch or other indicator that data should either always be generated or should never be generated. In the alternative, it may be possible to identify destination addresses which either want or do not want the additional data transferred. As yet another alternative, some combination of the two can be used. Thus, on a case-by-case basis such a mechanism may help reduce the overall burden on the system. In FIG. 7, such means for examining would probably be incorporated into message property extraction component 182. Then message property extraction component 182 would be able to evaluate the desirability of generating additional data in light of its understanding of what should be done.

Although it would be possible to simply transfer properties 186 to server 168 during the transfer process, such a situation generally is not desirable. It is generally desirable to encode desired information in a way that is easily understandable to the receiving server. Thus, embodiments within the scope of this invention may comprise means for encoding additional extension data prior to transfer to the receiving server. By way of example, and not limitation, such means for encoding is illustrated in FIG. 7 by property encoding component 188. Property encoding component 188 may encode the desired properties in any fashion that is mutually understandable between server 166 and server 168. One possible embodiment for property encoding component 188 is presented in conjunction with FIG. 9 below. In FIG. 7, property encoding component 188 produces separate per-message and per-recipient subpackets. Theses are illustrated in FIG. 7 by 190, 192, and 194. Encoded subpackets 190, 192, and 194 can then be promptly assembled into the appropriate additional data if it is discovered that the receiving server supports the desired extension.

Since information is transferred from one server to another, embodiments within the scope of this invention may comprise means for transferring a transfer-ready mail message and additional data from a sending server to a receiving server. By way of example, and not limitation, in FIG. 7 such means for transferring is illustrated by communications protocol driver 196. The responsibility of communication protocol driver 196 is to ensure that the proper protocol is followed and the proper data communicated to receiving server 168. This is illustrated in FIG. 7 by communication protocol driver 196 having access to all required information during its communication with receiving server 168. Communications protocol driver 196 may comprise means for establishing a connection between the transferring server and the receiving server using a desired protocol. In FIG. 7 this is illustrated by establish connection step 198. Embodiments within the scope of this invention may also comprise means for transferring the envelope of the transfer-ready message from a sending server to a receiving server. By way of example, and not limitation, this is illustrated in FIG. 7 by transfer envelope step 200. Embodiments may also comprise means for transferring additional data from a sending server to a receiving server using a designated protocol extension. In FIG. 7, this is illustrated, by way of example and not limitation, by transfer extension data step 202. Embodiments within the scope of this invention also comprise means for transferring a message from a sending server to a receiving server. By way of example, and not limitation, such means is illustrated by transfer encoded message step 204. Finally, embodiments may comprise means for terminating a connection between a sending server and a receiving server. By way of example, and not limitation, in FIG. 7 such means is illustrated by terminate connection step 206.

On the receiving server, embodiments must be designed to receive information transferred from the sending server. Thus, embodiments within the scope of this invention may comprise means for receiving information transferred by a means for transferring. In FIG. 7, by way of example and not limitation, such means is illustrated by communications protocol driver 208. Communications protocol driver 208 is designed to respond to the requests and information sent by sending server 166. Communications protocol driver 208 may also be responsible for storing information as it is received so that it is not lost.

Since information received from server 166 may be encoded or translated in some form or fashion for transfer between server 166 and server 168, in certain circumstances it may be desirable to supply server 168 with decoders that allow the encoding or translation process that occurs on server 166 to be reversed. Thus, embodiments within the scope of the present invention may comprise means for decoding information received from a sending server. By way of example and not limitation, in FIG. 7 means for decoding additional data is represented by decoder 210 and means for decoding messages received from the sending server is illustrated by decoder 212. Thus, decoder 210 may take an extension data packet received from the sending server, such as extension data packet 214 and extract per-message and per-recipient subpackets 190, 192, and 194. Similarly, decoder 212 may take encoded messages 180 and, possibly, envelope 176 and extract message 170. All this assumes, of course, that receiving server 168 wishes to translate encoded message 180 and extension data packet 214 back into their original form and not a different form.

Figure 8A:
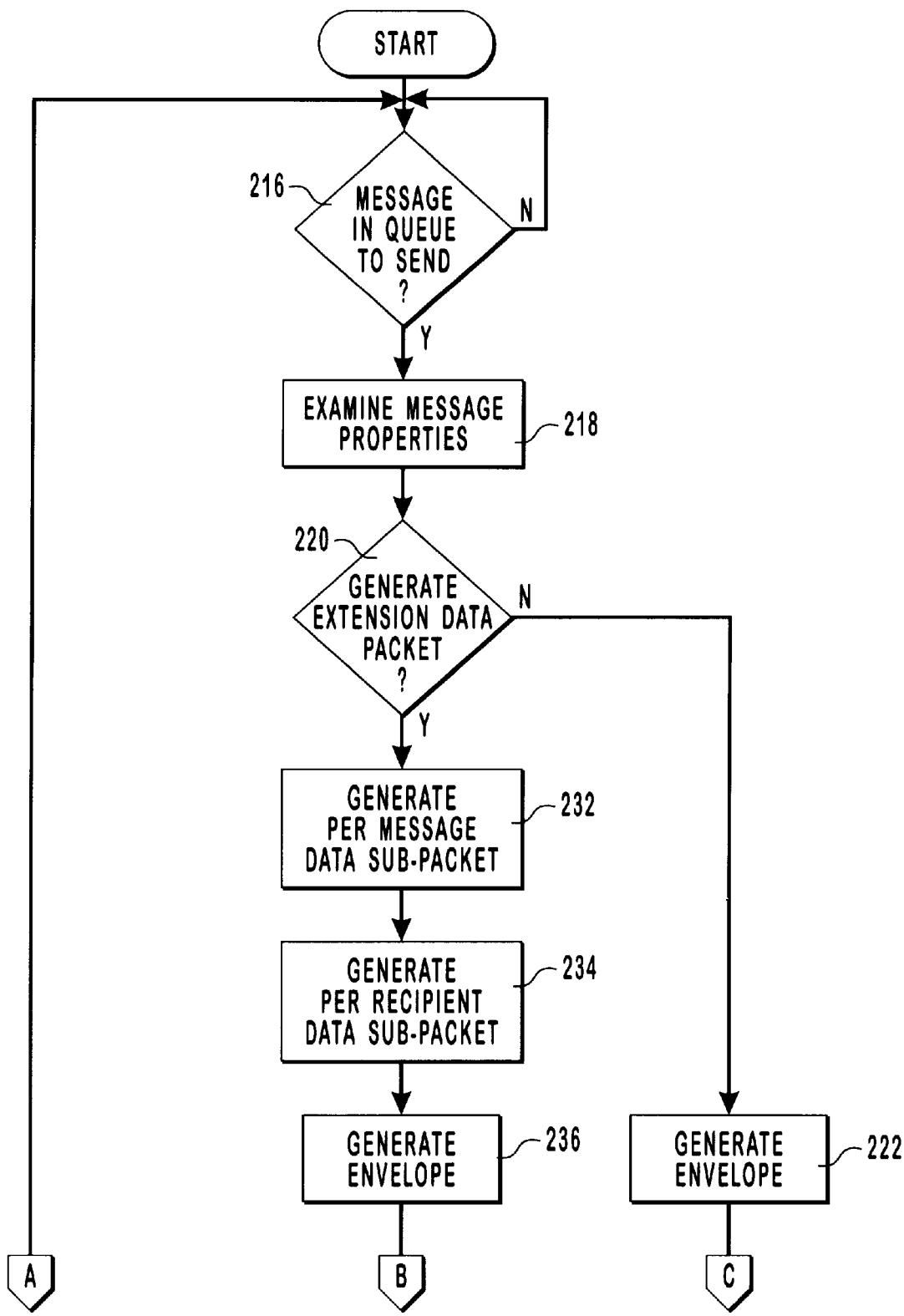
FIGS. 8A and 8B present a flow diagram of one embodiment of the present invention.
Figure 8B:
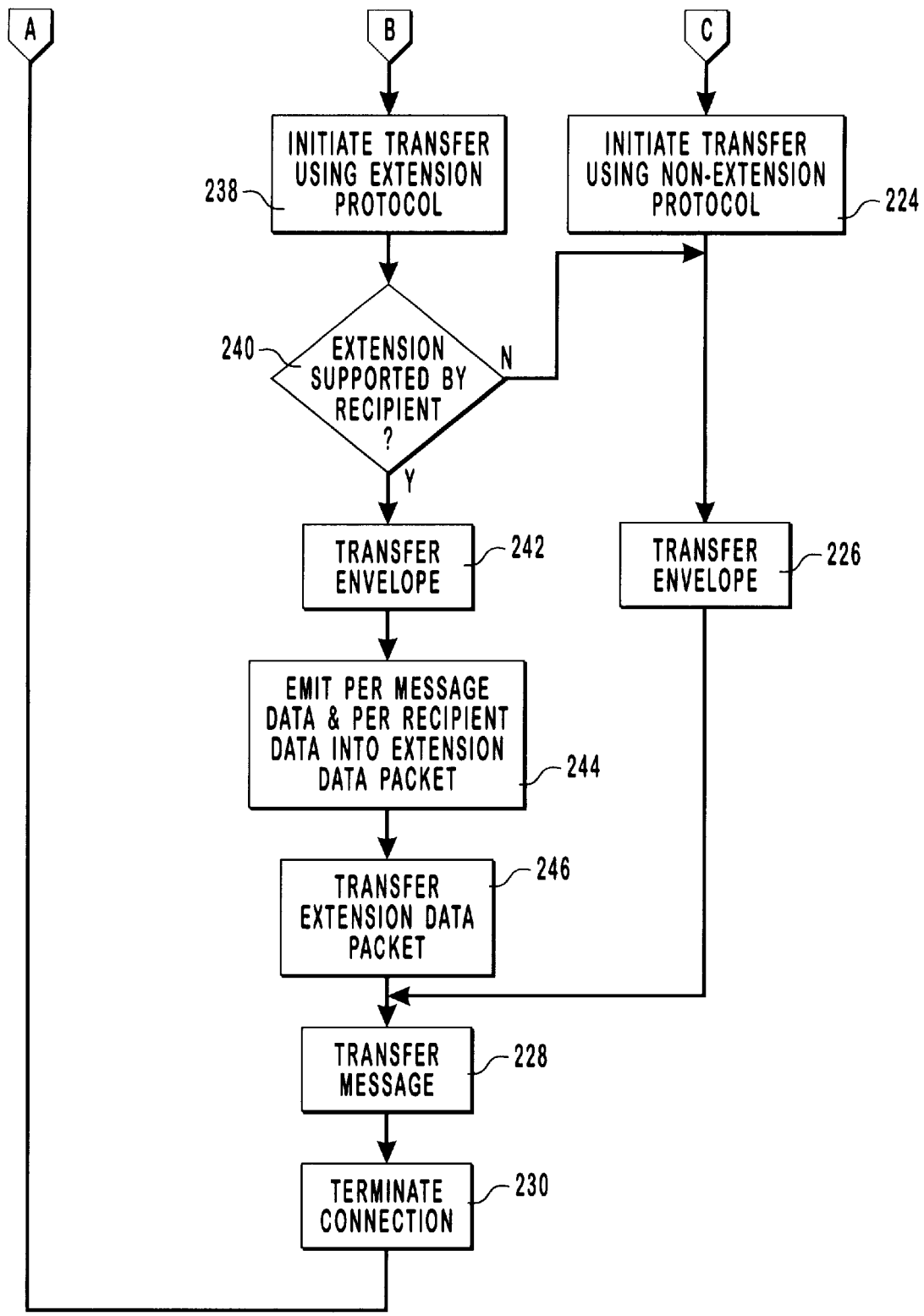

Turning now to FIGS. 8A and 8B, the overall process of creating a transmit ready-mail record and any associated extension data and transferring the same to a receiving server is presented. These figures represent just one possible embodiment of the preset invention and should not, therefore, be construed as limiting of its scope.

The process begins with decision block 216 which causes the process to wait until a message is ready to be transmitted. Execution then proceeds to block 218 which examines the message properties to identify whether an extension data package should be generated for this message. Step 218 represents yet another example of means for examining a message in order to determine whether to transfer additional data and whether the transfer of such data is likely to be supported by the receiving network. As previously mentioned, there may be several ways to accomplish this. Some information may be available by examining the message properties. In other circumstances, the required information may be found elsewhere. For example, a server may have a flag or other indicator that extension data should not be sent. Thus, if such an indicator is available then the system may use the indicator to determine whether or not to generate and send extension data. In the alternative, an indicator may be set that extension data should always be created. As yet another example, certain indicators in the data may help determine whether or not to generate extension packet data. For example, if the message is to be transmitted in an encoding format that preserves all information, and such information is easy to obtain, it may be redundant to utilize extension data to transmit properties. Furthermore, certain types of messages, such as specific types of delivery reports and the like, may not need such extension data. Any data available that can help the system determine whether or not to generate data can be employed at this point.

Execution then moves to decision block 220 where the information collected at step 218 is examined and a decision is made as to whether or not to generate extension data packet. If not, then the message is transferred using standard protocol mechanisms. For SMTP, or other protocols which use an envelope and message session, such procedures can be like those illustrated in FIG. 8A beginning with step 222 which generates an appropriate envelope if one does not already exist. Step 222 is yet another example of means for generating the envelope of a transfer-ready mail message. Following the path of execution over to FIG. 8B, execution proceeds with step 224 in which the connection between the sending server and the receiving server is opened. Because extension data will not be sent, step 234 is performed using standard non-extension protocols. Step 224 is yet another example of the means for establishing a connection between a sending server and a receiving server.

After the connection has been opened, execution proceeds to step 226 where the envelope is transferred from the sending server to the receiving server. Step 226 is yet another example of means for transferring the envelope of a transfer-ready mail message.

After transfer of the envelope in step 226, execution proceeds to step 228 where the message is transferred. This step refers to the transfer of a message, such as the 822 message of SMTP. Step 228 is yet another example of means for transferring the message of a transfer-ready mail message. Finally, the connection is terminated in step 230 and execution proceeds back to the start. Step 230 is another example of means for terminating a connection between a sending server and a receiving server.

Returning to decision block 220 on FIG. 8A, if the indication is that an extension data packet should be generated and transferred to the receiving server, then execution proceeds to step 232 where any information that is to be placed in the per-message data subpacket is assembled and the per-message data subpacket is generated. In step 234, the information necessary for each per-recipient data subpacket is assembled, and the per-recipient data subpackets are generated. Steps 232 and 234 represent yet another example of means for encoding additional data prior to transfer of the additional data to the receiving server.

Once all the appropriate data subpackets have been assembled, step 236 generates the appropriate envelope or envelopes for the transfer-ready mail messages. Step 236 represents yet another example of means for generating an envelope. Following the execution over to FIG. 8B, the next step is to initiate transfer using the appropriate protocol extensions. As previously indicated in conjunction with the examples given with FIG. 6, when SMTP is used, one of the commands sent early in the connection process provokes a response from the receiving server to provide a list of all the extensions that the receiving server supports. This command is not sent in the non-extended SMTP protocol. Thus, it may be necessary to initiate the connection process using the appropriate initial protocol commands. Execution then proceeds to step 240 where a determination is made as to whether the receiving server supports the appropriate extension. If not, execution proceeds over to step 226 and continues as previously described.

If, however, the extension is supported by the receiving server, execution proceeds to step 242 where the appropriate envelope is transferred. Next, in step 244, the per-message and per-recipient subpackets are encoded and placed into an extension data packet. In step 246, the extension data packet is transferred to the receiving node using the extensions to the desired protocol. Finally, the message is transferred and the connection terminated as illustrated in steps 228 and 230, and as previously described. Steps 238, 242, 246, 228, and 230 represent examples of means for establishing a connection between a transmitting server and a receiving server, means for transferring an envelope to a receiving server, means for transferring additional data to said receiving server, means for transferring an encoded message to a receiving server, and means for terminating the connection to a receiving server, respectively. Other embodiments of this aspect of the invention are also possible.

Figure 9:
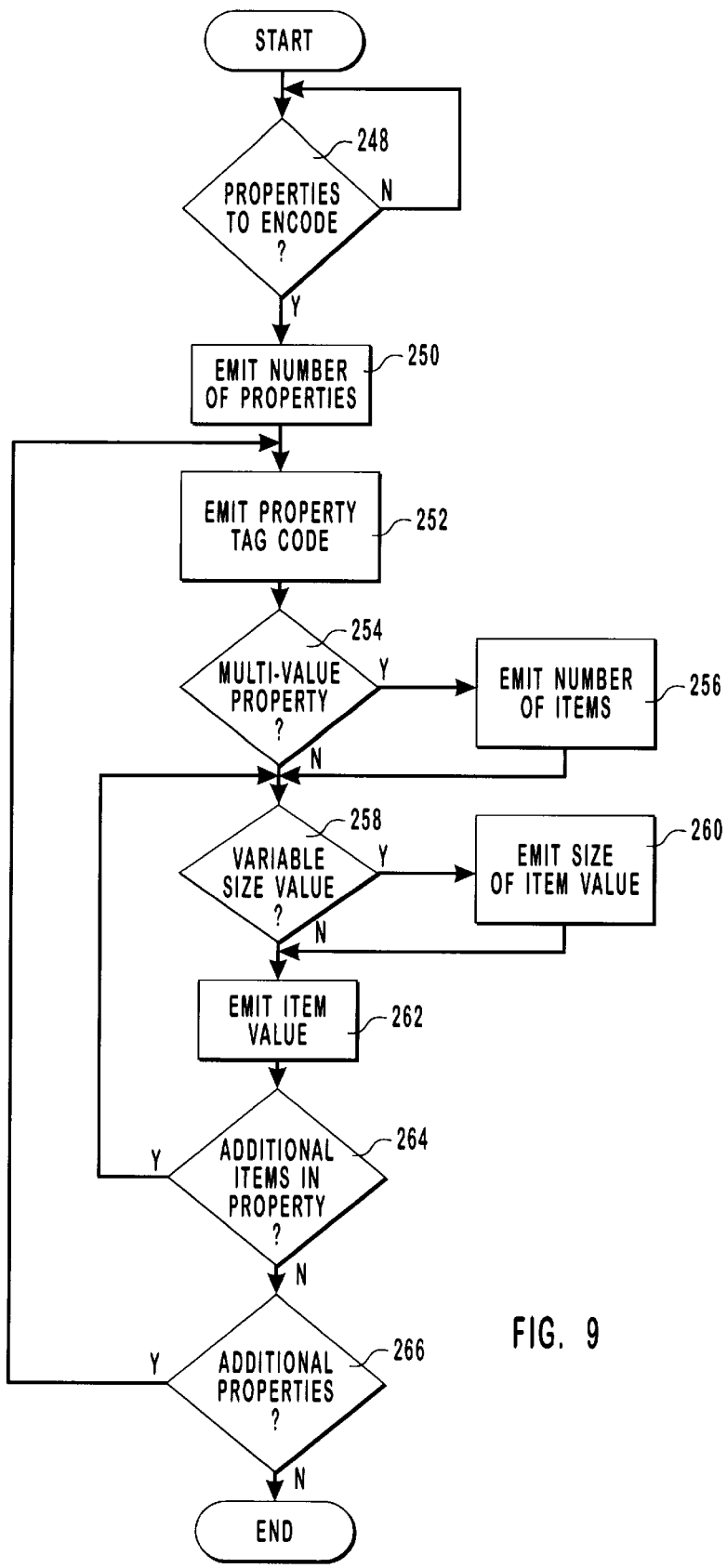
FIG. 9 presents a flow diagram of one embodiment which encodes additional information to be transferred between servers.

Referring now to FIG. 9, one embodiment of an encoder suitable for use with the present invention to encode additional data that will be sent to a receiving server as part of a designated protocol, is presented. The process begins with decision block 248 which waits until a property exists that should be encoded. Step 250 then emits into the encoded data stream the number of properties that are encoded in this extension data sub-packet. In one embodiment, the number of properties is represented by a DWORD. Execution then proceeds to step 252 where the property tag code for the next property in line is emitted. As explained in greater detail in conjunction with a detailed example presented below, a property tag code has two portions. The first portion comprises an identifier for the property name. Such an identifier may be any identifier that can be uniquely associated with the property. In one embodiment of the present invention, the property identifier is two bytes long. The second portion of the property tag code is an identifier that identifies the property data type. For example, property could be a string, a boolean value, a double word, or any other valid property type. In one embodiment a two-byte code is used to identify the property data type.

After the property tag code has been emitted, execution proceeds to decision block 254 where a test is made to determine whether the property is a multi-value property. Certain types of properties may be like data objects or data structures in that they have various values in a single property. For example, perhaps a property has a boolean value as well as a numerical value. If a property has multiple values, then information on each item and its associated value within the property must be emitted into the encoded data stream. If the property is multi-valued, then execution proceeds to step 256 where the number of items is emitted. In one embodiment, the number of items is emitted as a DWORD. If a property only has one value, then the number of items in the property is one. Thus, for single valued properties the number of items is not emitted.

Execution then proceeds to decision block 258 which identifies whether the property is of a data type that can have a variable length. Strings are a good example of a data type that has a variable length. If a data type has a variable length, then the length of the property must be emitted into the data stream so that when it is decoded the beginning and end can be located. Thus, a variable size property type will cause execution to proceed to step 260 where the size of the item is emitted. In one embodiment, the size is emitted as a DWORD.

Execution then proceeds to step 262 where the value of the property is emitted. After the value, execution proceeds to decision block 264 which tests whether there are any remaining items in multi-valued properties left to be processed. If so, execution proceeds back to decision block 258. If not, execution proceeds to decision block 266 which tests whether any remaining properties need to be processed. If so, execution proceeds to step 252, otherwise the properties have been encoded according to the defined method. The embodiment illustrated in FIG. 9 represents but one possible implementation of a means for encoding additional data so that it can be transferred to a receiving server with a transfer-ready mail message.

In addition to the encoding described in FIG. 9, it may also be desirable to pad the output data stream so that it is aligned on a particular word or double word boundary in order to prevent sever performance degradation that can occur with certain types of microprocessors. For example, certain RISC processors suffer a severe performance degradation when they retrieve data that is not aligned on a double word boundary. This is discussed in greater detail in the example below.

In order that the procedure illustrated in FIG. 9 might be more fully explained, the following example is presented. For this example, consider a system that has the following data types along with the number of bytes occupied by the value of the data type:

TABLE 1

| PropType | Size of Emitted Value |
|---|---|
| PT_NULL | This type will not be emitted into MDBEF, it will be ignored |
| PT_I2 | 2 Bytes |
| PT-BOOLEAN | 2 Bytes |
| PT_LONG | 4 Bytes |
| PT_R4 | 4 Bytes |
| PT_I8 | 8 Bytes |
| PT_DOUBLE | 8 Bytes |
| PT_CURRENCY | 8 Bytes |
| PT_APPTIME | 8 Bytes |
| PT_SYSTIME | 8 Bytes |
| PT_CLSID | 16 Bytes |
| PT_STRING8 | Variable: Len of string + 1 byted for termination of NULL |
| PT_UNICODE | Variable: 2*Len of string + 2 bytes for string terminator |
| PT_SVREID | Variable: Len of binary stream |
| PT_BINARY | Variable: Len of binary stream |

For this example, suppose that server 1 has a message to send to server 2 and that server 1 determines that there is some data that it would like to transfer in the 821 session if possible. The data to be sent is contained in Tables 2–5 below. Table 2 contains the per-message properties that should be sent, and Tables 3–5 contain the properties that should be sent on a per-recipient basis for recipients 1–3, respectively.

TABLE 2

Per-Message ((A) 3 properties to encode):

| Property Name | Property Date Type | Property ID | Property Value |
|---|---|---|---|
| PR_IMPORTANCE | (B) PT_LONG | (C) x0017 | (D) 1 |
| PER_SUBJECT_A | (E) PT_STRING8 | (F) 0x0037 | (G) SUB-TEST\0 |
| PR_AUTO-FORWARDED | (H) PT_BOOLEAN | (I) 0x0005 | (J) 0 |

TABLE 3

| Recipient #1 (r1@xyz.com): | No extra data to send |
|---|---|

TABLE 4

Recipient #2 (r2@xyz.com) ((K) 2 props to encode):

| Property Name | Property Date Type | Property ID | Property Value |
|---|---|---|---|
| PR_REPLY-REQUESTED | (L) PT_BOOLEAN | (M) 0x0C17 | (N) 0 |
|  | (O) PT_BOOLEAN | (P) 0x3A40 | (Q) 1 |

TABLE 5

Recipient #3 (r3@xyz.com) ( ⑧ 2 props to encode):

| Property Name | Property Date Type | Property ID | Property Value |
|---|---|---|---|
| PR_REPLY-REQUESTED | (S) PT_BOOLEAN | (T) 0x0C17 | (U) 0 |
| User Defined Prop | (V) PT_MV-BINARY | (W) 0x5555 | (X) #of Values 2<br>(Y1) Bin.cb = 3,<br>(Z1) Bin.1pb = 03 A2 F1<br>(Y2) Bin.cb = 5,<br>(Z2) Bin.1pb = 04 02 34 54 99 |

Using the method of encoding the properties in Tables 2–5 according to FIG. 9 results in the following encoded subpackets. The subpacket for each is listed using hex bytes with letter codes below each hex byte to indicate where the value came from. In other words, hex bytes with the letter A underneath came from the number of properties to encode from Table 2, which is marked with the letter A. The encoded subpackets are as follows:

Per-Message:

03 00 00 00 - 03 00 17 00 - 01 00 00 00 - 1E 00 37 00 - 08 00 00 00 - 53 55 42 54
AA AA AA AA - BB BB CC CC - DD DD DD DD - EE EE FF FF - Strlen(G)+1 - GG GG GG GG
45 53 54 00 - 0B 00 05 00 - 00 00
GG GG GG GG - HH HH II II - JJ JJ Per-Recip #2:

02 00 00 00 - 0B 00 17 0C - 00 00 0B 00 - 40 3A 01 00
KK KK KK KK - LL LL MM MM - NN NN OO OO - PP PP QQ QQ

Per-Recip #3:

02 00 00 00 - 0B 00 17 0C - 00 00 02 11 - 55 55 02 00 - 00 00 03 00 - 00 00 03 A2
RR RR RR RR - SS SS TT TT - UU UU VV VV - WW WW XX XX - XX XX Y1 Y1 - Y1 Y1 Z1 Z1
F1 05 00 00 - 00 04 02 34 - 54 99
Z1 Y2 Y2 Y2 - Y2 Y2 Z2 Z2 - Z2 Z2

Note that in the above there are no encoded properties for recipient #1. This is because recipient #1 had no extra data to send.

During an SMTP transfer of a message from server 1 to server 2, with server 1 being the sender and server 2 being the receiving server, the session may proceed as follows:

| | |
|---|---|
| S: | Initiate Connect |
| R: | IMC ready |
| S: | EHLO |
| R: | 250 IMC supports the following commands |
| R: | 250 XEXCH50 |
| R: | 250 HELP |
| S: | MAIL FROM: bob@abc.com |
| R: | 250 OK |
| S: | RCPT TO: r1@xyz.com |
| R: | 250 OK |
| S: | RCPT TO: r2@xyz.com |
| R: | 250 OK |
| S: | RCPT TO: r3@xyz.com |
| R: | 550 BAD RECIP |
| S: | XEXCH50 3 64 |
| R: | 250 OK |
| S: | (Sends byte stream as described below) |
| R: | OK |
| S: | DATA |
| R: | 354 Send Data, end with CRLF.CRLF |
| S: | (Sends 822 ending with CRLF.CRLF) |
| R: | 250 OK |
| S: | QUIT |
| R: | 250 OK |

Note that the syntax for the XEXCH50 command is the key word XEXCH50 followed by the number of subpackets that are to be sent followed by the total number of bytes that are to be sent. Thus, the command "XEXCH50 3 64" means that three subpackets will be sent with a total of 64 bytes. The byte stream for the XEXCH50 command is generated from the per-message and per-recipient subpackets produced by the encoding of FIG. 9 above. In addition, the following rules are applied. First the order of the subpackets is important. The first subpacket should be the per-message subpacket with one recipient subpacket for each recipient acknowledged and known by the receiving server. If a subpacket does not exist, a zero placeholder is inserted. Finally, each subpacket is padded by zero to three padding bytes in order to round out the total number of bytes of each subpacket to a number that is evenly divisible by 4. The bytes are preferably ordered in network order. Therefore, for the above example the following 64 bytes are emitted:

```
00 00 00 22 - 03 00 00 00 - 03 00 17 00 - 01 00 00 00 - 1E 00 37 00 - 08 00 00 00

-----A-----    ------------------------------------B-----------------------------

53 55 42 54 - 45 53 54 00 - 0B 00 05 00 - 00 00 00 00 - 00 00 00 00 - 00 00 00 10

------------------------B--------------------- --C--    -----D-----   -----E-----

02 00 00 00 - 0B 00 17 0C - 00 00 0B 00 - 40 3A 01 00

--------------------------F------------------------
```
A - Size of Per Message Subpacket (excluding padding) as DWORD in network byte order
B - Per Message Subpacket
C - Padding for Per Message Subpacket to align on DWORD boundary.
D - Size of Recip #1 per-recip subpacket. Zero indicates no subpacket for this recip.
E - Size of Recip #2 per-recip subpacket.
F - Recip #2 per-recip subpacket.

In this situation since recipient #3 was rejected by the receiving server, recipient #3's data is not included in the extension data packet.

Figure 10:
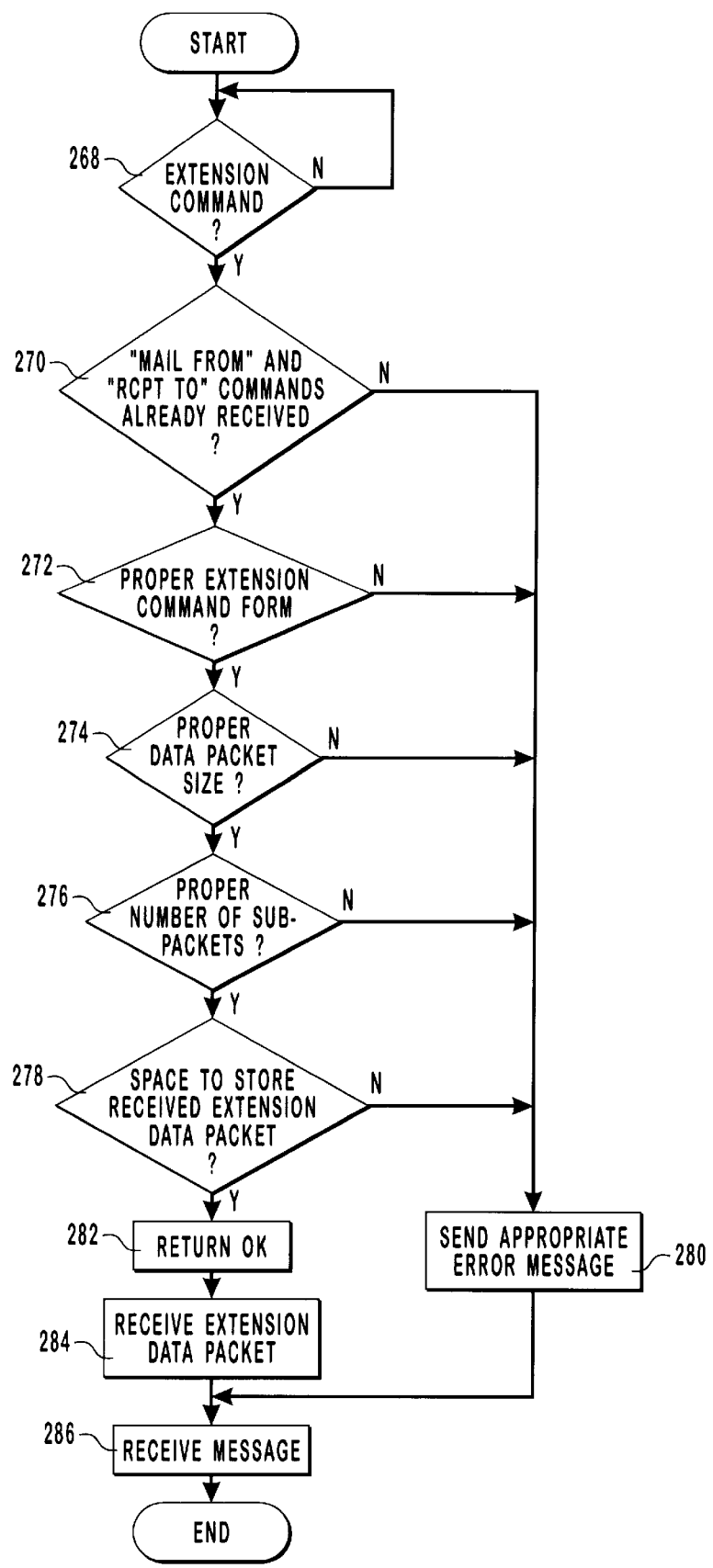
FIG. 10 illustrates one embodiment of a receiving node that implements the present invention.

Referring now to FIG. 10, one embodiment of the component that receives information from a sending server, such as communication protocol driver 208 of FIG. 7. Recognizing that the embodiment illustrated in FIG. 10 is exemplary only and thus should not be considered to be limited of its scope, the embodiment illustrated in FIG. 10 shows only the processing loop for the extension command and for the message. The receipt of the envelope is well known in the art and is not illustrated in FIG. 10.

The embodiment in FIG. 10 waits at decision block 268 until the extension command is identified. This means that the Xexch 50 command has been received from the sending server. Execution then proceeds through decision blocks 270–278 which test various errors conditions. If any of these decision blocks detect an error, execution will proceed to step 280 where an appropriate error message is returned to descending server. Afterwards, execution would proceed to step 286 in order to await the transfer of the message from the sending server. This is done to provide the maximum amount of robustness in this component so that an error will not terminate reception of any remaining valid data. If the sending server decides to terminate operation, then the receiving server will terminate its operation.

Returning now to decision block 270, this decision block tests to make sure that the envelope has already been received by testing whether the "MAIL FROM" and "RCPT TO" commands have already been received. Decision block 270 tests whether the extension command has the proper form. Decision block 274 tests whether the overall extension data packet size is correct. Recall that each subpacket is padded with 0–3 bites in order to ensure proper double word alignment. This means that the overall data packet size should be divisible by 4. Decision block 276 tests whether the proper number of subpackets were submitted with the extension command. Decision block 278 tests whether there is space available to store the received extension data packet. Only when all of these conditions are satisfied will execution reach 278 where an OK is returned in order to allow reception of the extension data packet, which is received at step 284. Execution then proceeds to step 286 as previously explained.

In summary, the present invention provides an extension to the SMTP protocol that allows any desired data to be transmitted right after the 821 envelope data is transmitted. This allows the data to be readily available to the receiving server. In addition, since the data is not interpreted by any component of the SMTP protocol, the extension may be used to transfer data that would otherwise be striped or lost when email messages are backboned across an SMTP network. The scope of the invention goes beyond the specific application to the SMTP protocol and similar techniques may be used with any protocol that allows extensibility in a similar manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network system where messages created by a plurality of clients are transferred using mail messages comprising an envelope and said message between a plurality of mail servers using a defined protocol, a method for transferring said mail message between said servers using said defined protocol and for transferring additional data using an extension to said defined protocol, said method comprising the steps of:

creating by a client a message in a first format to be sent via the networked system to a destination location;

sending said message to a first of said servers for transfer via the networked system to said destination location;

creating a mail message from said message by associating said message with an envelope created for said message;

extracting one or more properties from said message;

establishing by said first of said servers a connection between said first of said servers and a second of said servers using procedures defined as part of an established protocol normally used to transfer mail messages between said servers;

transferring said envelope of said mail message from said first server to said second server using said protocol;

transferring said extracted one or more properties from said first server to said second server using an extension to said protocol;

transferring said message of said mail message from said first server to said second server using said protocol; and terminating by said first server said connection to said second server.

2. A method for transferring a mail message as recited in claim 1 wherein said message comprises a plurality of properties, including said one or more properties, said plurality of properties together defining said message and wherein the method further comprises the step of:

identifying said one or more properties that should be extracted prior to the step of extracting said one or more properties.

3. A method for transferring a mail message as recited in claim 1 wherein said established protocol is an SMTP protocol.

4. A method for transferring a mail message as recited in claim 1 further comprising the step of checking to see if said extension to said protocol is supported by said second of said servers.

5. A method for transferring a mail message as recited in claim 1 wherein said message is encoded from said first format into a format suitable for use with said established protocol.

6. A method for transferring a mail message as recited in claim 1 wherein said message comprises properties, including said one or more properties, which together define said message and wherein said step of extracting said one or more properties comprises encoding said one or more properties, including the steps of:

(a) emitting the number of said one or more properties to be extracted and encoded;

(b) obtaining the next property to be encoded;

(c) emitting a property tag comprising an id value which identifies said next property and an data type value which identifies the data type of said next property;

(d) if said next property is a multi-valued property comprised of a plurality of items, then emitting the number of items in said next property;

(e) if a next item of said next property is of a data type that is variable in length, then emitting the size of said next item;

(f) emitting the value of said next item;

(g) if additional items remain in said next property then returning to step (e); and (h) if additional properties remain to be encoded, then returning to step (b).

7. A method for transferring a mail message as recited in claim 1, further comprising, prior to the step of extracting said one or more properties, the step of determining whether the transfer of said extracted one or more properties is likely to be either desired or supported by said second server.

8. In a network system (a) comprising (i) a first network where messages are transferred internally using a first protocol, said first network comprising a first server, and (ii) a second network where messages are also transferred internally using said first protocol, said second network comprising a second server, and (b) wherein mail messages are transferred between said first server and said second server using a second protocol and (c) wherein said mail messages comprise a message and an envelope, a method for transferring said mail messages between said servers using said second protocol and for transferring extension data with said mail messages using an extension to said second protocol, said method comprising the steps of:

creating, by a client system, a message to be sent via the networked system to a destination location, said method including properties that together define said message;

sending said message to said first server of said first network;

encoding, by said first server, said message in a format suitable for transfer to said second server of said second network using said second protocol;

creating a mail message from said encoded message by associating said encoded message with an envelope created for said message;

selecting one or more of said properties included in said message, wherein said one or more properties are to be sent to said second server as extension data;

establishing by said first server a connection between said first server and said second server using said second protocol;

transferring said envelope of said mail message from said first server to said second server using said second protocol;

transferring said extension data from said first server to said second server using an extension to said second protocol; and transferring said encoded message of said mail message from said first server to said second server using said second protocol.

9. A method for transferring a mail message as recited in claim 8 wherein said extension data is transferred to said second server only if said second server supports said extension to said second protocol.

10. A method for transferring a mail message as recited in claim 9 wherein during the step of establishing said connection between said first server and said second server data is sent to said second server that elicits information that allows said first server to determine if said second server supports said extension to said second protocol.

11. A method for transferring a mail message as recited in claim 10 wherein said second protocol is an SMTP protocol.

12. A method for transferring a mail message as recited in claim 11, further comprising the step of encoding said one or more properties, including the steps of:

(a) emitting the number of said one or more properties that are to be sent to said second server as said extension data;

(b) obtaining the next of said one or more properties to be encoded;

(c) emitting a property tag comprising an id value which identifies said next property and an data type value which identifies the data type of said next property;

(d) if said next property is a multi-valued property comprised of a plurality of items, then emitting the number of items in said next property;

(e) if a next item of said next property is of a data type that is variable in length, then emitting the size of said next item;

(f) emitting the value of said next item;

(g) if additional items remain in said next property then returning to step (e); and (h) if additional properties of said one or more properties remain to be encoded then returning to step (b).

13. A method for transferring a mail message as recited in claim 12 wherein said extension data comprises at least a first portion comprising per-message data and a second portion comprising per-recipient data.

14. In a network system (a) comprising (i) a first network where messages are transferred internally using a non-SMTP protocol, said first network comprising a first server, and (ii) a second network where messages are also transferred internally using said non-SMTP protocol, said second network comprising a second server, and (b) wherein mail messages are transferred between said first server and said second server using an SMTP protocol and (c) wherein said mail messages comprise a message and an envelope, a method for transferring said mail messages between said servers using said SMTP protocol and for transferring extension data with said mail messages using an extension to said SMTP protocol, said method comprising the steps of:

receiving at a first server a mail message comprising an envelope and a message that is to be transferred from said first server to a second server using an SMTP protocol;

establishing an SMTP session between said first server and said second server by said first server sending to said second server an SMTP request designed to elicit a response from said second server that will return any SMTP extensions supported by said second server;

receiving, at said first server, a list comprising all SMTP extensions supported by said second server, said list having been sent by said second server in response to said SMTP request and including a designated extension;

transferring said envelope of said mail message using the SMTP protocol from said first server to said second server;

based on said designated extension having been included in said list, then sending by said first server to said second server an encoded data packet comprising extension data, said encoded data packet being sent in addition to said envelope and said message of said mail message using said designated extension, said extension data including one or more selected properties of said message;

transferring said message of said mail message using the SMTP protocol from said first server to said second server; and terminating, by said first server, the SMTP session with said second server.

15. A network system comprising:

a first network wherein mail messages are transferred internally using a first protocol, said first network comprising a first server;

a second network wherein mail messages are also transferred internally using said first protocol, said second network comprising a second server;

means for encoding a message which exists in a format suitable for internal storage and transfer in said first network into a format suitable for transfer to said second network using a second protocol, said encoded message being associated with an envelope to produce a transfer-ready mail message;

means for extracting, from said message, one or more properties that are to be transferred to said second network along with said transfer-ready mail message; and means for transferring said transfer-ready mail message and said extracted one or more properties from said first server to said second server, said means for transferring comprising:

means for establishing a connection between said first server and said second server using said second protocol;

means for transferring said envelope of said transfer-ready mail message from said first server to said second server using said second protocol;

means for transferring said extracted one or more properties from said first server to said second server using an extension to said second protocol; and means for transferring said encoded message of said transfer-ready mail message from said first server to said second server using said second protocol.

16. A networking system as recited in claim 15 further comprising means for generating said envelope of said transfer-ready mail message.

17. A networking system as recited in claim 15 further comprising means for encoding said extracted one or more properties prior to transfer to said second server.

18. A networking system as recited in claim 17 wherein said message comprises a plurality of properties that include said one or more properties, said plurality of properties together defining said message, and wherein said means for encoding said extracted one or more properties operates using a method comprising the steps of:

(a) emitting the number of said one or more properties to be extracted and encoded;

(b) obtaining the next property to be encoded;

(c) emitting a property tag comprising an id value which identifies said next property and an data type value which identifies the data type of said next property;

(d) if said next property is a multi-valued property comprised of a plurality of items, then emitting the number of items in said next property;

(e) if a next item of said next property is of a data type that is variable in length, then emitting the size of said next item;

(f) emitting the value of said next item;

(g) if additional items remain in said next property then returning to step (e); and (h) if additional properties remain to be encoded, then returning to step (b).

19. A networking system as recited in claim 17 further comprising means for decoding, at said second network, said extracted one or more properties.

20. A networking system as recited in claim 15 further comprising means for receiving information transferred by said means for transferring said transfer-ready mail message and said extracted one or more properties.

21. A networking system as recited in claim 15 further comprising means for examining said message in order to determine whether transfer of said extracted one or more properties is likely to be supported by said second server.

22. A networking system as recited in claim 15 wherein said second protocol is an SMTP protocol.

23. A networking system as recited in claim 22 wherein said means for establishing sends an EHLO command in accordance with said SMTP protocol when said connection is being established between said first server and said second server.

24. A computer-readable medium having a plurality of data fields stored thereon, said plurality of data fields representing an extension data packet that has been constructed by a sending server and is to be transferred from the sending server to a receiving server with a mail message that includes a message and an envelope, said plurality of data fields having encoded thereon one or more properties that have been extracted from said message by said sending server and comprising:

a first data field stored in a first region of a range of memory addresses in said medium containing data representing the number of said one or more properties contained in said extension data packet;

a first set of data fields stored in a second region of said range of memory addresses, said first set of data fields being associated with a per-message property that has been extracted from said message by said sending server, said first set of data fields comprising:
  a second data field containing a per-message property tag representing a data type of the per-message property and a name of the per-message property; and
  a third data field encoding said per-message property and containing data representing the value of said per-message property; and
a second set of data fields stored in a third region of said range of memory addresses said second set of data fields being associated with a per-recipient property that has been extracted from said message by said sending server, said second set of data fields comprising:
  a fourth data field containing a per-recipient property tag representing a data type of the per-recipient property and a name of the per-recipient property; and
  a fifth data field encoding said per-recipient property and containing data representing the value of said per-recipient property.

25. A computer-readable medium, as an article of manufacture, for use with a network system comprising (a) a first network comprising a first server, and (b) a second network comprising a second server, said computer-readable medium having computer-executable instructions encoded thereon, comprising:
  means for encoding a message which exists in a format suitable for internal storage and transfer in said first network into a format suitable for transfer to said second network using a message transfer protocol, said encoded message being associated with an envelope to produce a transfer-ready mail message;
  means for extracting, from said message, one or more properties that are to be transferred to said second network along with said transfer-ready mail message; and
  means for transferring said transfer-ready mail message and said extracted one or more properties from said first server to said second server, said means for transferring comprising:
    means for establishing a connection between said first server and said second server using said message transfer protocol;
    means for transferring said envelope of said mail message from said first server to said second server using said message transfer protocol;
    means for transferring said extracted one or more properties from said first server to said second server using an extension to said message transfer protocol; and
    means for transferring said encoded message of said mail message from said first server to said second server using said message transfer protocol.

26. A computer-readable medium as recited in claim 25 further comprising means for generating said envelope of said transfer-ready mail message.

27. A computer-readable medium as recited in claim 25 further comprising means for encoding said extracted one or more properties prior to transfer to said second server.

28. A computer-readable medium as recited in claim 27 wherein said message comprises a plurality of properties that include said one or more properties, said plurality of properties together defining said message, and wherein said means for encoding said extracted one or more properties operates using a method comprising the steps of:
  (a) emitting the number of said one or more properties to be extracted and encoded;
  (b) obtaining the next property to be encoded;
  (c) emitting a property tag comprising an id value which identifies said next property and an data type value which identifies the data type of said next property;
  (d) if said next property is a multi-valued property comprised of a plurality of items, then emitting the number of items in said next property;
  (e) if a next item of said next property is of a data type that is variable in length, then emitting the size of said next item;
  (f) emitting the value of said next item;
  (g) if additional items remain in said next property then returning to step (e); and
  (h) if additional properties remain to be encoded, then returning to step (b).

29. A computer-readable medium as recited in claim 27 further comprising means for decoding, at said second network, said extracted one or more properties.

30. A computer-readable medium as recited in claim 25 further comprising means for receiving information transferred by said means for transferring said transfer-ready mail message and said extracted one or more properties.

31. A computer-readable medium as recited in claim 25 further comprising means for examining said message in order to determine whether transfer of said extracted one or more properties is likely to be supported by said second server.

32. A computer-readable medium as recited in claim 25 wherein said message transfer protocol is an SMTP protocol.

33. A computer-readable medium as recited in claim 32 wherein said means for establishing sends an EHLO command in accordance with said SMTP protocol when said connection is being established between said first server and said second server.

34. In a network system where messages created by a plurality of clients are transferred using mail messages comprising an envelope and said message between a plurality of mail servers using a defined protocol, a method for transferring said mail message between said servers using said defined protocol and for transferring additional data using an extension to said defined protocol, said method comprising the steps of:
  creating by a client a message in a first format to be sent via the networked system to a destination location, the message including properties that together define the message;
  sending said message to a first of said servers for transfer via the networked system to said destination location;
  creating a mail message from said message by associating said message with an envelope created for said message;
  obtaining additional data to be sent with said mail message, the additional data including at least one of said properties encoded using at least the steps of:
    (a) emitting the number of said properties to be included in said additional data;
    (b) obtaining the next property to be encoded;
    (c) emitting a property tag comprising an id value which identifies said next property and an data type value which identifies the data type of said next property;

(d) if said next property is a multi-valued property comprised of a plurality of items, then emitting the number of items in said next property;

(e) if a next item of said next property is of a data type that is variable in length, then emitting the size of said next item;

(f) emitting the value of said next item;

(g) if additional items remain in said next property then returning to step (e); and (h) if additional properties remain to be encoded then returning to step (b);

establishing by said first of said servers a connection between said first of said servers and a second of said servers using procedures defined as part of an established protocol normally used to transfer mail messages between said servers;

transferring said envelope of said mail message from said first server to said second server using said protocol;

transferring said additional data from said first server to said second server using an extension to said protocol;

transferring said message of said mail message from said first server to said second server using said protocol; and terminating by said first server said connection to said second server.

* * * * *

UNITED STATES PATENT AND TRADEMARK OFFICE
CERTIFICATE OF CORRECTION

PATENT NO. : 6,035,327

DATED : March 7, 2000

INVENTOR(S) : David Buckley, Donald Gordon Brown, Wayne Merl Cranston

It is certified that error appears in the above-identified patent and that said Letters Patent is hereby corrected as shown below:

Col. 1, ln. 51: delete [TIraditionally] and replace it with --Traditionally--

Col. 3, ln. 63: after "messages" delete [lo]

Col. 5, ln. 43: after "can" insert --be--

Col. 10, ln. 7: delete [is] and insert --it--

Col. 13, ln. 2: delete [terminate] and insert --terminating--

Col. 15, ln. 22: delete [informatio n] and insert --information--

Col. 15, ln. 23: delete [ex tension] and insert --extension--

UNITED STATES PATENT AND TRADEMARK OFFICE
CERTIFICATE OF CORRECTION

PATENT NO. : 6,035,327

DATED : March 7, 2000

INVENTOR(S) : David Buckley, Donald Gordon Brown, Wayne Merl Cranston

It is certified that error appears in the above-identified patent and that said Letters Patent is hereby corrected as shown below:

Col. 15, ln. 25: delete [need s] and insert --needs--

Col. 15, ln. 49: delete [de termin] and insert --determine--

Col. 15, ln. 50: delete [thc] and insert --the--

Signed and Sealed this

Sixteenth Day of January, 2001

Attest:

Q. TODD DICKINSON

Attesting Officer

Commissioner of Patents and Trademarks